US012180436B2

(12) United States Patent
Williams et al.

(10) Patent No.: US 12,180,436 B2
(45) Date of Patent: Dec. 31, 2024

(54) LAUNDRY CARE PARTICLES HAVING A SMALL VARIATION IN AVERAGE PORE RADIUS

(71) Applicant: The Procter & Gamble Company, Cincinnati, OH (US)

(72) Inventors: Kristin Rhedrick Williams, West Chester, OH (US); Richard Albert Huddleston, Cincinnati, OH (US); Ke Ming Quan, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 337 days.

(21) Appl. No.: 17/591,773

(22) Filed: Feb. 3, 2022

(65) Prior Publication Data

US 2023/0242851 A1 Aug. 3, 2023

(51) Int. Cl.

| | |
|---|---|
| ***C11D 17/06*** | (2006.01) |
| ***C11D 1/72*** | (2006.01) |
| ***C11D 1/722*** | (2006.01) |
| ***C11D 3/08*** | (2006.01) |
| ***C11D 3/10*** | (2006.01) |
| ***C11D 3/37*** | (2006.01) |
| ***C11D 3/386*** | (2006.01) |
| ***C11D 3/50*** | (2006.01) |
| ***C11D 17/00*** | (2006.01) |

(52) U.S. Cl.
CPC ............ *C11D 17/06* (2013.01); *C11D 3/3707* (2013.01); *C11D 3/505* (2013.01)

(58) Field of Classification Search
None
See application file for complete search history.

(56) References Cited

U.S. PATENT DOCUMENTS

| | | | | |
|---|---|---|---|---|
| 8,476,219 B2 | 7/2013 | Aouad | | |
| 9,878,467 B2 | 1/2018 | Huddleston et al. | | |
| 10,301,579 B2 | 5/2019 | Dykstra et al. | | |
| 10,696,929 B2 | 6/2020 | Miracle et al. | | |
| 11,186,803 B2 | 11/2021 | Corona et al. | | |
| 2011/0021409 A1* | 1/2011 | Cox | C11D 3/3719 | 510/438 |
| 2012/0270765 A1* | 10/2012 | Aouad | C11D 3/128 | 264/211 |
| 2016/0368169 A1* | 12/2016 | Huddleston | C11D 3/3707 | |
| 2018/0195028 A1 | 7/2018 | Hartshorn | | |
| 2019/0367841 A1* | 12/2019 | Panandiker | C11D 3/3715 | |

(Continued)

FOREIGN PATENT DOCUMENTS

| | | | |
|---|---|---|---|
| EP | 1754779 A1 * | 2/2007 | C11D 1/02 |
| WO | 2022132542 A1 | 6/2022 | |

OTHER PUBLICATIONS

16224 PCT Search Report and Written Opinion for PCT/US2022/070495 dated Sep. 8, 2022, 14 pages.

*Primary Examiner* — Lorna M Douyon
(74) *Attorney, Agent, or Firm* — Gary J. Foose

(57) ABSTRACT

A composition including a plurality of individual particles. The individual particles include a water soluble carrier and a fabric care benefit active agent. Each individual particle has a flat bottom, a rounded top, and maximum height. Each individual particle has a porous bottom third, a porous middle third, and a porous top third. The bottom third average pore radius and the top third average pore radius differ by less than about 15 μm.

18 Claims, 8 Drawing Sheets

(56) References Cited

U.S. PATENT DOCUMENTS

| | | | | |
|---|---|---|---|---|
| 2020/0172836 | A1* | 6/2020 | Corona, III | C11D 3/227 |
| 2022/0184851 | A1* | 6/2022 | Quan | B29B 9/02 |
| 2023/0089534 | A1* | 3/2023 | Freund | C11D 3/2093<br>510/337 |
| 2023/0391964 | A1 | 12/2023 | Huddleston et al. | |

* cited by examiner

LAUNDRY CARE PARTICLES HAVING A SMALL VARIATION IN AVERAGE PORE RADIUS

FIELD OF THE INVENTION

Laundry care particles.

BACKGROUND OF THE INVENTION

Consumers desire products that can simplify the processes they use to do their laundry, help them reduce the amount of time that they spend dealing with soiled laundry, and help them achieve high levels of benefits. Consumers are well positioned to understand the amount of fabric care composition that is required to provide benefit they desire. As a result, fabric care products that enable consumers to customize the amount of fabric care composition they use are popular with many consumers.

Fabric care products that can be delivered in the wash are particularly easy for consumers to use. For instance, the consumer can simply place the fabric care product in the tub of the washing machine along with the laundry and start the washing machine cycle.

Typically, consumers use a fabric care detergent composition that contains an appreciable quantity of surfactants and other cleaning ingredients. Such fabric care compositions are often provided in soluble unit dose pouches that contain a prescribed quantity of fabric care active agents. Fabric care compositions are also provided in liquid or powder forms and the consumer is provided with a measuring cup to provide a measured quantity of fabric care composition. These types of products may be referred to as fully formulated fabric care compositions.

To provide for fabric care benefits above and beyond what can be provided by using fully formulated fabric care compositions, fabric care products that are additives are popular with consumers. Consumers enjoy and are satisfied by using fabric care additives that are packaged in a manner the enables the consumer to use a custom amount of the fabric care additive based on the consumer's judgment of how much of the fabric care additive is needed to provide the desired benefit. Such fabric care additives are conveniently provided through the wash along with fully formulated fabric care compositions but are dosed separately from the fully formulated fabric care composition.

Fabric care additives in the form of particles have become attractive to many consumers. Some fabric care additive particles are provided with a porous structure. Particles having a porous structure can float in the water as the wash liquor is formed. Particles that float may tend to dissolve more completely in the wash as compared to particles that sink because particles that sink may become trapped in folds, creases, and pockets of the laundry during washing. Undissolved particles tend to incompletely deliver the fabric care benefit active agent contained in the particle, which may be undesirable to the consumer. Particles that float and include unencapsulated perfume may provide a pleasant scent to the headspace above the wash liquor and the room within which the washing machine is positioned. Further, particles that float may better distribute the fabric care additives to the laundry during the wash cycle.

Melt processing is a common approach for forming particles. One problem with making porous particles via a melt process is that the bubbles within the melt tend to coalesce and rise out of the molten material as the melted precursor material solidifies. This can result in large pores at or near an outer surface of the particle, an irregular rough outer surface, an overly irregular distribution of pore sizes within solidified particles, and eruptions of bubbles and molten material from the surface of the particle as it solidifies. Such particles may be less durable than particles that have a more competent outer surface and be prone to becoming dusty, messy to use, and appear to be of poor quality. The tendency of bubbles within the melt to coalesce and rise out of the molten material as the melted precursor material solidifies can also effectively limit the volume of pores that can be provided in particles without these adverse consequences occurring.

With these limitations in mind, there is a continuing unaddressed need for fabric care additives in the form of particles that have a uniform distribution of pore sizes throughout the particle.

SUMMARY OF THE INVENTION

A composition comprising a plurality of individual particles, wherein said individual particles comprise: about 20% to about 99% by weight water soluble carrier; and about 0.1% to about 45% by weight fabric care benefit active agent; wherein each of said individual particles have a flat bottom, a rounded top, and a maximum height orthogonal to said flat bottom; wherein each of said individual particles have a porous bottom third extending from said flat bottom to a bottom third section height above said flat bottom that is one-third said maximum height and said bottom third has a bottom third average pore radius; wherein each of said individual particles have a porous middle third above said bottom third and extending from said bottom third to a middle third section height above said bottom third that is one-third of said maximum height; wherein each of said individual particles have a porous top third above said middle third and extending from said middle third to a top third section height above said middle third that is one-third of said maximum height and said top third has a top third average pore radius; wherein said bottom third average pore radius and said top third average pore radius differ by less than about 15 μm; and wherein each of said particles has a mass from about 5 mg to about 200 mg, optionally from about 10 mg to about 100 mg, optionally from about 20 mg to about 50 mg.

DETAILED DESCRIPTION OF THE INVENTION

Water Soluble Carrier

Figure 1:
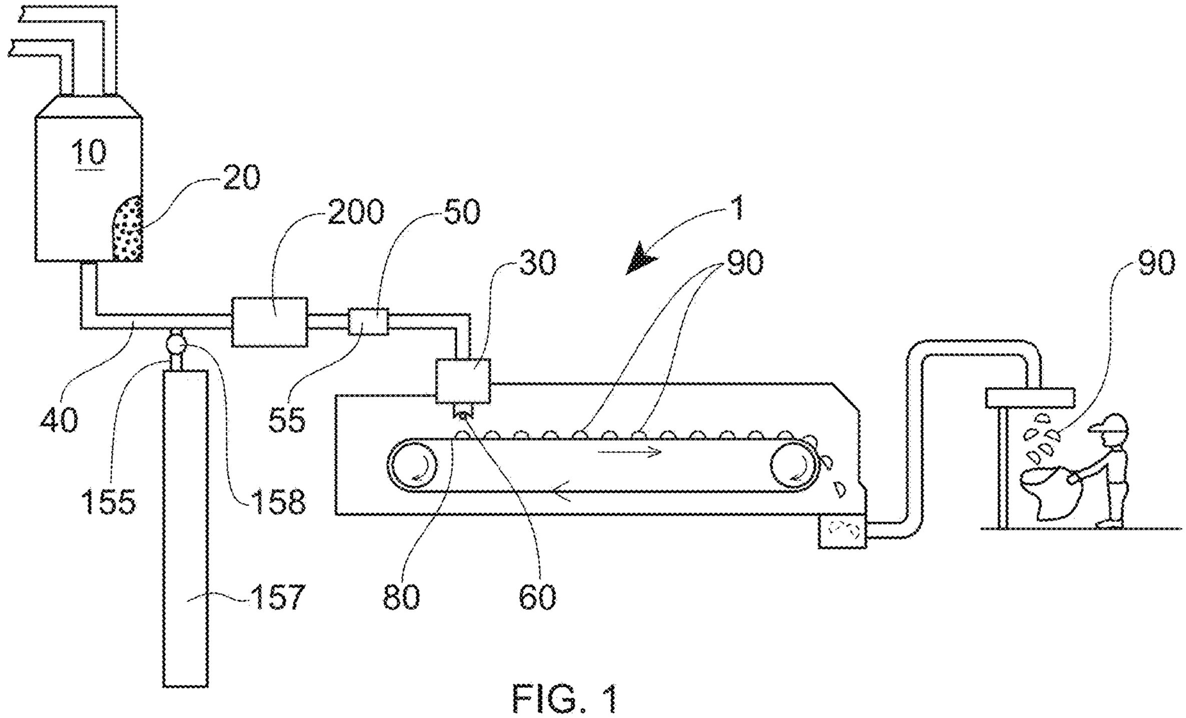
FIG. 1 is an apparatus for forming particles.

The particles, and thus precursor material as described below, can comprise a water soluble carrier. The water soluble carrier can be a water soluble polymer. The water soluble carrier acts to carry the fabric care benefit active agent to the wash liquor. Upon dissolution of the water soluble carrier, the fabric care benefit active agent is dispersed into the wash liquor and deposited onto the laundry.

The water soluble carrier can be a material that is soluble in a wash liquor within a short period of time, for instance less than about 10 minutes.

Water soluble means that the material, carrier material, or particle is soluble or dispersible in water, and optionally has a water-solubility of at least 50%, optionally at least 75% or even at least 95%, as measured by the method set out hereafter using a glass-filter with a maximum pore size of 20 microns: 50 grams±0.1 gram of the carrier is added in a pre-weighed 400 mL beaker and 245 mL±1 mL of distilled water is added. This is stirred vigorously on a magnetic stirrer set at 600 rpm, for 30 minutes. Then, the mixture is filtered through a sintered-glass filter with a pore size as defined above (max. 20 micron). The steps are performed at a temperature of 23° C.±1.0° C. and a relative humidity of 50%±2%. The water is dried off from the collected filtrate by any conventional method, and the weight of the remaining material is determined (which is the dissolved or dispersed fraction). Then, the percentage solubility or dispersibility can be calculated.

The water soluble carrier can be selected from the group of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof.

Alkali metal salts can be, for example, selected from the group of salts of lithium, salts of sodium, and salts of potassium, and any combination thereof. Useful alkali metal salts can be, for example, selected from the group of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group of sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof.

Alkaline earth metal salts can be selected from the group of salts of magnesium, salts of calcium, and the like, and combinations thereof. Alkaline earth metal salts can be selected from the group of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof.

Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., a sorbate). Sorbates can be selected from the group of sodium sorbate, potassium sorbate, magnesium sorbate, calcium sorbate, and combinations thereof.

The water soluble carrier can be or comprise a material selected from the group of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The water soluble carrier can be selected from the group of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the water soluble carrier can be sodium chloride. In one embodiment, the water soluble carrier can be table salt.

The water soluble carrier can be or comprise a material selected from the group of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The water soluble carrier can be selected from the group of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The water soluble carrier can be selected from the group of disaccharides, polysaccharides, silicates, zeolites, carbonates, sulfates, citrates, and combinations thereof.

The water soluble carrier can be selected from the group of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof.

The water soluble carrier can be a water soluble polymer. The water soluble polymer can be selected from the group of C8-C22 alkyl polyalkoxylate comprising more than about 40 alkoxylate units, ethoxylated nonionic surfactant having a degree of ethoxylation greater than about 30, polyalkylene glycol having a weight average molecular weight from about 2000 Da to about 15000 Da, optionally from about 2000 Da to about 13000 Da and combinations thereof.

The water soluble polymer can be a block copolymer having Formulae (I), (II), (III) or (IV), $R^1O$-(EO)x-(PO)y-$R^2$ (I), $R^1O$—(PO)x-(EO)y-$R^2$ (II), $R^1O$-(EO)o-(PO)p-(EO)q-$R^2$ (III), $R^1O$—(PO)o-(EO)p-(PO)q-$R^2$ (IV), or a combination thereof; wherein EO is a $—CH_2CH_2O—$ group, and PO is a $—CH(CH_3)CH_2O—$ group; $R^1$ and $R^2$ independently is H or a C1-C22 alkyl group; x, y, o, p, and q independently is 1-100; provided that the sum of x and y is greater than 35, and the sum of o, p and q is greater than 35; wherein the block copolymer has a molecular weight ranging from about 3000 Da to about 15,000 Da.

The water soluble polymer can be a block copolymer or block copolymers, for example a block copolymer based on ethylene oxide and propylene oxide selected from the group of PLURONIC-F38, PLURONIC-F68, PLURONIC-F77, PLURONIC-F87, PLURONIC-F88, and combinations thereof. PLURONIC materials are available from BASF.

The water soluble polymer can be selected from the group of polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the water soluble polymer can be selected from the group of PVA; PVA copolymers; hydroxypropyl methyl cellulose (HPMC); and mixtures thereof.

The water soluble polymer can be selected from the group of polyvinyl alcohol, modified polyvinyl alcohol, polyvinyl pyrrolidone, polyvinyl alcohol/polyvinyl pyrrolidone, polyvinyl alcohol/polyvinyl amine, partially hydrolyzed polyvinyl acetate, polyalkylene oxide, polyethylene glycol, acrylamide, acrylic acid, cellulose, alkyl cellulosics, methyl cellulose, ethyl cellulose, propyl cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides, starch, modified starch, gelatin, alginates, xyloglucans, hemicellulosic polysaccharides, xylan, glucuronoxylan, arabinoxylan, mannan, glucomannan, galactoglucomannan, natural gums, pectin, xanthan, carrageenan, locus bean, arabic, tragacanth, polyacrylates, sulfonated polyacrylates, water-soluble acrylate copolymers, alkylhydroxy cellulosics, methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates, polyvinyl alcohol copolymers, hydroxypropyl methyl cellulose, and mixtures thereof.

The water soluble polymer can be an organic material. Organic water soluble polymers may provide a benefit of being readily soluble in water.

The water soluble polymer can be selected from the group of polyethylene glycol, polypropylene glycol polyoxoalkylene, polyethylene glycol fatty acid ester, polyethylene glycol ether, starch, and mixtures thereof.

The water soluble polymer can be polyethylene glycol (PEG). PEG can be a convenient material to employ to make particles because it can be sufficiently water soluble to dissolve during a wash cycle when the particles have the range of mass disclosed herein. Further, PEG can be easily processed as melt. The onset of melt temperature of PEG can vary as a function of molecular weight of the PEG. The particles can comprise about 20% to about 94% by weight PEG having a weight average molecular weight from about 2000 Da to about 15000 Da. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 Da to about 13,000 Da, alternatively from about 4,000 Da to about 13,000 Da, alternatively from about 4,000 Da to about 12,000 Da, alternatively from about 4,000 Da to about 11,000 Da, alternatively from about 5,000 Da to about 11,000 Da, alternatively from about 6,000 Da to about 10,000 Da, alternatively from about 7,000 Da to about 9,000 Da, alternatively combinations thereof. PEG is available from BASF, for example PLURIOL E 8000, or other PLURIOL product. The water soluble polymer can be a mixture of two or more polyethylene glycol compositions, one having a first weight average molecular weight (e.g. 9000 Da) and the other having a second weight average molecular weight (e.g. 4000 Da), the second weight average molecular weight differing from the first weight average molecular weight.

The particles can comprise about 20% to about 99% by weight water soluble carrier. The particles can comprise from about 35% to about 95%, optionally from about 40% to about 90%, optionally from about 50% to about 80%, optionally combinations thereof and any whole percentages or ranges of whole percentages within any of the aforementioned ranges, of water soluble carrier by weight of the particles.

The plurality of particles can comprise individual particles that comprise about 20% to about 99% by weight of the particles water soluble carrier; and about 0.1% to about 45% by weight of the particles fabric care benefit active agent or agents; wherein the fabric care benefit active agent or agents are dispersed in a matrix of the water soluble polymer.

The particles can comprise from about 20% to about 99% by weight of the individual particles of PEG. Optionally, the individual particles can comprise from about 20% to about 95%, optionally from about 35% to about 95%, optionally from about 40% to about 90%, optionally from about 50% to about 80%, optionally combinations thereof and any whole percentages or ranges of whole percentages within any of the aforementioned ranges, of PEG by weight of the particles.

The water soluble polymer can comprise a material selected from the group of: a polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; a polyethylene glycol fatty alcohol ether of formula $HO—(C_2H_4O)_s—(CH_2)_t)—CH_3$ wherein s is from about 30 to about 250 and t is from about 10 to about 30; and mixtures thereof. The polyalkylene polymer of formula $H—(C_2H_4O)_x—(CH(CH_3)CH_2O)_y—(C_2H_4O)_z—OH$ wherein x is from about 50 to about 300, y is from about 20 to about 100, and z is from about 10 to about 200, can be a block copolymer or random copolymer.

The water soluble polymer can comprise: polyethylene glycol; a polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200; a polyethylene glycol fatty acid ester of formula $(C_2H_4O)_q—C(O)O—(CH_2)_r—CH_3$ wherein q is from about 20 to about 200 and r is from about 10 to about 30; and a polyethylene glycol fatty alcohol ether of formula $HO—(C_2H_4O)_s—(CH_2)_t)—CH_3$ wherein s is from about 30 to about 250 and t is from about 10 to about 30.

The water soluble polymer can comprise from about 20% to about 95% by weight of the plurality of particles or by weight of the individual particles of polyalkylene polymer of formula $H—(C_2H_4O)_x—(CH(CH_3)CH_2O)_y—(C_2H_4O)_z—OH$ wherein x is from about 50 to about 300; y is from about 20 to about 100, and z is from about 10 to about 200.

The water soluble polymer can comprise from about 1% to about 20% by weight of the plurality of particles or by weight of the individual particles polyethylene glycol fatty acid ester of formula $(C_2H_4O)_q—C(O)O—(CH_2)_r—CH_3$ wherein q is from about 20 to about 200 and r is from about 10 to about 30.

The water soluble polymer can comprise from about 1% to about 10% by weight of the plurality of particles or by weight of the individual particles of polyethylene glycol fatty alcohol ether of formula $HO—(C_2H_4O)_s—(CH_2)_t)—CH_3$ wherein s is from about 30 to about 250 and t is from about 10 to about 30.

The water soluble carrier can comprise plasticizer polyol (from 0% to 3% by weight of the particles), wherein the plasticizer polymer is optionally a liquid at 20 C and 1 atmosphere of pressure; water (from 1% to 20%, or 1% to 12%, or 6% to 8%, by weight of the particles); sugar alcohol polyol selected from the group of erythritol, xylitol, mannitol, isomalt, maltitol, lactitol, trehalose, lactose, tagatose, sucralose, and mixtures thereof (from 45% to 80%, or 50% to 70%, or 50% to 60%, by weight of the particles); wherein said particles further comprise: (a) modified starch having a dextrose equivalent from 15 to 20 and said sugar alcohol polyol and said modified starch are present at a weight ratio of said sugar alcohol polyol to said modified starch from 2:1 to 16:1, or from 2:1 to 10:1, or from 2:1 to 3:1; or (b) modified starch having a dextrose equivalent from 4 to less than 15 and said sugar alcohol polyol and said modified starch are present at a weight ratio of said sugar alcohol polyol to said modified starch from 1.5:1 to 16:1, or from 1.5:1 to 10:1, or from 1.5:1 to 4. The modified starch can have a dextrose equivalent from 15 to 20 and said sugar alcohol polyol and said modified starch can be present at a ratio from 2:1 to 16:1, or from 2:1 to 10:1, or from 2:1 to 3:1. The modified starch can have a dextrose equivalent from 4 to less than 15 and said sugar alcohol polyol and said modified starch can be present at a weight ratio of said sugar alcohol polyol to said modified starch from 1.5:1 to 16:1, or from 1.5:1 to 10:1, or from 1.5:1 to 4:1. The modified starch can have a dextrose equivalent from 4 to 12. The modified starch can be maltodextrin. The sugar alcohol polyol can be mannitol. The plasticizer polyol can be selected from the group of glycerin, dipropylene glycol, propylene glycol, and mixtures thereof.

The particles can comprise more than about 20% by weight water soluble carrier. The particles can comprise more than about 40% by weight water soluble carrier. The particles can comprise from about 20% to about 99% by weight water soluble carrier. Optionally, the particles can comprise from about 35% to about 85%, or even from about 40% to about 90%, or even from about 50% to about 80%, by weight of the particles water soluble carrier. The water soluble carrier can be selected from the group of a polyalkylene polymer of formula $H—(C_2H_4O)_x—(CH(CH_3)CH_2O)_y—(C_2H_4O)_z—OH$ wherein x is from 50 to 300, y is from 20 to 100, and z is from 10 to 200; a polyethylene glycol fatty acid ester of formula $(C_2H_4O)_q—C(O)O—(CH_2)_r—CH_3$ wherein q is from 20 to 200 and r is from 10 to 30; a polyethylene glycol fatty alcohol ether of formula $HO—(C_2H_4O)_s—(CH_2)_t)—CH_3$ wherein s is from 30 to 250 and t is from 10 to 30; C8-C22 alkyl polyalkoxylate comprising more than 40 alkoxylate units; polyethylene glycol having a weight average molecular weight from 2000 Da to 15000 Da; EO/PO/EO block copolymer; PO/EO/PO block copolymer; EO/PO block copolymer; PO/EO block copolymer; polypropylene glycol; ethoxylated nonionic surfactant having a degree of ethoxylation greater than 30; polyvinyl alcohol; polyalkylene glycol having a weight average molecular weight from 2000 Da to 15000 Da; and mixtures thereof.

Fabric Care Benefit Active Agent

The particles can comprise about 0.1% to about 45% by weight fabric care benefit active agent. A fabric care benefit active agent is a substance provided as part of the composition of particles in a sufficient quantity to impart a benefit to the fabric being treated with the particles.

The fabric care benefit active agent can be selected from the group of an amine, a surfactant system, nonionic surfactant, a water-binding agent, a sulfite, fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, cyclodextrin complexed benefit agents, soil removal/anti-redeposition agents, encapsulated perfumes, polymeric dispersing agents, polymeric grease cleaning agents, brighteners, suds suppressors, dyes, hueing agents, free perfume, structure elasticizing agents, fabric softening agents, quaternary amines, hard and soft tallow, hydrotropes, organic solvents, anti-microbial agents and/or preservatives, neutralizers and/or pH adjusting agents, processing aids, fillers, antioxidants, rheology modifiers or structurants, opacifiers, pearlescent agents, pigments, anti-corrosion and/or anti-tarnishing agents, and mixtures thereof. The fabric care benefit active agent can be selected from the group of an antimicrobial, antioxidant, perfume, fabric conditioning agent, dye, dye fixative, and combinations thereof. The fabric care benefit active agent can be unencapsulated perfume or encapsulated perfume.

Perfume

The fabric care benefit agent can be perfume. A perfume is an oil or fragrance that includes one or more odoriferous compounds, for example synthetic products of the ester, ether, aldehyde, ketone, alcohol, and hydrocarbon type. Mixtures of various odoriferous substances, which together produce an attractive fragrant note, can be used. Such perfume oils can also comprise natural mixtures of odoriferous compounds, as are available from vegetal sources.

Perfume can be a substantially water insoluble composition comprising perfume components, optionally mixed with a suitable solvent or diluent. Suitable solvents or diluents include compounds selected from the group of ethanol, isopropanol, diethylene glycol monoethyl ether, dipropylene glycol, diethyl phthalate, triethyl citrate, and mixtures thereof.

The perfume can be provided as unencapsulated perfume. The perfume can be provided in a perfume delivery system. Zeolite and cyclodextrine are examples of perfume delivery systems. The perfume can be encapsulated in starch. For example an emulsion of starch and perfume oil can be spray dried to form particles of starch having droplets of perfume dispersed within the starch matrix. Perfume delivery systems can be particulate materials or fine particulate materials that may be difficult to handle in a manufacturing environment due to the possibility that the particles may become suspended in air.

The perfume can be encapsulated perfume. Encapsulated perfume is commonly employed in laundry products. Encapsulated perfume comprises a plurality of droplets of liquid perfume each of which are encapsulated in an encapsulate shell. Perfume may be encapsulated in a water soluble or water insoluble encapsulate shell. Encapsulate shell can comprise melamine-urea-formaldehyde, melamine formaldehyde, urea formaldehyde, starch, and the like materials. The encapsulate shell wall can be a material selected from polyethylenes; polyamides; polyvinylalcohols, optionally containing other co-monomers; polystyrenes; polyisoprenes; polycarbonates; polyesters; polyacrylates; polyolefins; polysaccharides, e.g., alginate and/or chitosan; gelatin; shellac; epoxy resins; vinyl polymers; water insoluble inorganics; silicone; aminoplasts; and mixtures thereof. When the encapsulate shell comprises an aminoplast, the aminoplast may comprise polyurea, polyurethane, and/or polyureaurethane. The polyurea may comprise polyoxymethyleneurea and/or melamine formaldehyde. Encapsulates having an encapsulate shell comprising a polysaccharide can be practical. The encapsulate shell can be selected from the group of chitosan, gum arabic, alginate, β-glucan, starch, starch derivatives, plant proteins, gelatin, alyssum homolocarpum seed gum, and combinations thereof.

The encapsulate shell can comprise from about 90% to 100%, optionally from about 95% to 100%, optionally from about 99% to 100% by weight of the shell of an inorganic material. The inorganic material can be selected from the group of metal oxide, semi-metal oxides, metals, minerals, and mixtures thereof, optionally selected from the group of $SiO_2$, $TiO_2$, $Al_2O_3$, $ZrO_2$, $ZnO_2$, $CaCO_3$, $Ca_2SiO_4$, $Fe_2O_3$, $Fe_3O_4$, clay, gold, silver, iron, nickel, copper, and mixtures thereof, optionally selected from the group of $SiO_2$, $TiO_2$, $Al_2O_3$, $CaCO_3$, and mixtures thereof, optionally $SiO_2$. The encapsulate shell can comprise a first shell component comprising a condensed layer and a nanoparticle layer, wherein the condensed layer comprises a condensation product of a precursor, and wherein the nanoparticle layer comprises inorganic nanoparticles, and wherein the condensed layer is disposed between the core and the nanoparticle layer, and a second shell component surrounding the first shell component, wherein the second shell component surrounds the nanoparticle layer. The encapsulate can be any of those encapsulates described in United States Patent Publications 2020/0330948 A1, 2020/0330949 A1, and 2020/0330950 A1 and U.S. Patent Application 63/092,829.

The perfume can comprise one or more fragrances of plant origin. A fragrance of plant origin is a concentrated hydrophobic liquid containing volatile chemical compound extracted from a plant. The fragrance of plant origin can be selected from the group of allspice berry, angelica seed, anise seed, basil, bay laurel, bay, bergamot, blood orange, camphor, caraway seed, cardamom seed, carrot seed, cassia, catnip, cedarwood, celery seed, chamomile german, chamomile roman, cinnamon bark, cinnamon leaf, citronella, clary sage, clove bud, coriander seed, cypress, elemi, eucalyptus, fennel, fir needle, frankincense, geranium, ginger, grapefruit pink, helichrysum, hop, hyssop, juniper berry, labdanum, lavender, lemon, lemongrass, lime, magnolia, mandarin, marjoram, melissa, mugwort, myrrh, myrtle, neroli, niaouli, nutmeg, orange sweet, oregano, palmarosa, patchouli, pennyroyal, pepper black, peppermint, petitgrain, pine needle, radiata, ravensara, rose, rosemary, rosewood, sage, sandalwood, spearmint, spikenard, spruce, star anise, sweet annie, tangerine, tea tree, thyme red, verbena, vetiver, wintergreen, wormwood, yarrow, ylang extra, and ylang III, and mixtures thereof.

The particles can comprise from about 0.1% to about 20% by weight of the particles perfume, optionally from about 0.1% to about 15%, optionally from about 0.1% to about 12%, optionally from about 1% to about 15%, optionally from about 2% to about 20%, optionally from about 8% to about 10% by weight of the particles perfume.

Perfume Emulsion Composition

The fabric care benefit agent can be a perfume emulsion composition. The perfume emulsion composition can comprise an aminofunctional silicone, wherein the aminofunctional silicone comprises one or more primary amine moieties, and wherein the aminofunctional silicone is characterized by a total amine content of from about 0.05 to about 2.2; one or more emulsifiers; one or more perfume raw materials, wherein the one or more perfume raw materials comprises an aldehyde moiety, a ketone moiety, or combinations thereof; and water.

The perfume emulsion composition can be any of those described in European Patent Office Application 20156010.9, filed Feb. 7, 2020.

The aminofunctional silicone can be characterized by:

(a) a total amine content of from about 0.071 to about 2.14, or from about 0.071 to about 1.78, or from about 0.71 to about 1.43, or from about 0.14 to about 1.07, or from about 0.14 to about 0.71, or from about 0.21 to about 0.71, or from about 0.36 to about 0.71; and/or (b) a primary amine content of from about 0.05 to about 2.2, optionally from about 0.071 to about 2.14, or from about 0.071 to about 1.78, or from about 0.71 to about 1.43, or from about 0.14 to about 1.07, or from about 0.14 to about 0.71, or from about 0.21 to about 0.71, or from about 0.36 to about 0.71; and/or (c) a ratio of primary amine content to total amine content of from about 1:2 to about 1:1, optionally from about 1.2:2, more optionally from about 1.5:2, or even more optionally from about 1.8:2.

The aminofunctional silicone can be characterized by the following formula:

$$[R_1R_2R_3SiO_{1/2}]_{(j+2l+2)}[R_4R_5SiO_{2/2}]_m[R_6SiO_{3/2}]_j[SiO_{4/2}]_l$$

wherein j is an integer from 0 to 150, optionally from 0 to 50, more optionally from 0 to 20;

m is an integer from 10 to 1500, optionally 10 to 1000, more optionally from 20 to 500;

l is an integer from 0 to 150, optionally from 1 to 150, more optionally from 0 to 50, most optionally from 0 to 20;

with the provisio j+m+l equals an integer greater than or equal to 50;

each of $R_1$, $R_2$, $R_3$, $R_4$, $R_5$ and $R_6$ moieties is independently selected from the group of H, OH, $C_1$-$C_{32}$ alkyl, $C_1$-$C_{32}$ substituted alkyl, $C_6$-$C_{32}$ aryl, $C_5$-$C_{32}$ substituted aryl, $C_6$-$C_{32}$ alkylaryl, $C_6$-$C_{32}$ substituted alkylaryl, $C_1$-$C_{32}$ alkoxy and $C_1$-$C_{32}$ substituted alkoxy, and X—Z, wherein at least one of the moieties $R_1$ through $R_6$=X—Z, optionally wherein each $R_{1-6}$ is independently selected from the group of OH, $C_1$-$C_2$ alkyl, $C_1$-$C_2$ substituted alkyl, $C_1$-$C_2$ alkoxy, $C_1$-$C_2$ substituted alkoxy, and X—Z;

wherein each X is independently a substituted or unsubstituted divalent alkylene or alkylidene radical comprising 2-12 carbon atoms, optionally each X is independently a substituted or unsubstituted divalent alkylene or alkylidene radical comprising 2-6 carbon atoms, most optionally each X is independently a substituted or unsubstituted divalent alkylene or alkylidene radical comprising 2-4 carbon atoms;

wherein each Z is a moiety comprising the one or more primary amine moieties, optionally wherein each Z is independently selected from the group —$NH_2$, —N(H)—X—$NH_2$, or a mixture thereof.

The emulsion composition can be characterized by at least one of characteristics (a) through (d):

(a) comprising from about 10% to about 70%, or from about 25% to about 65%, or from about 50% to about 65%, by weight of the silicone emulsion, of the aminofunctional silicone; and/or (b) comprising from about 30% to about 90%, or from about 35% to about 75%, or from about 35% to about 50%, by weight of the emulsion, of water; and/or (c) being characterized by a viscosity of from about 10 to about 500 Pa s, optionally from about 20 to about 400 Pa s, more optionally from about 25 to about 300 Pa s, even more optionally from about 100 to about 300 Pa s, measured at 0.1 rad/s and 25° C.; and/or (d) comprising a plurality of droplets, where the plurality of droplets is characterized by a mean diameter of from about 1 micron to about 5 microns.

The one or more perfume raw materials can comprise a material selected from the following:

a. oncidal, methyl nonyl acetaldehyde, adoxal, melanal, calypsone, or mixtures thereof;

b. cuminic aldehyde, benzaldehyde, anisic aldehyde, heliotropin, isocyclocitral, triplal/ligustral, 3,6-ivy carbaldehyde, ligustral, scentenal, or mixtures thereof;

c. satinaldehyde (jasmorange), otropal, cyclamen homoaldehyde, cyclamen aldehyde (cyclamal), lilial, canthoxal, floralozone, cinnemic aldehyde, or mixtures thereof;

d. delta-damascone, beta-damascone, alpha-damascone, nectaryl, or mixtures thereof;

e. vanillin, ethyl vanillin, or mixtures thereof; or f. a combination of materials selected from at least two categories of a, b, c, d, and e.

The one or more emulsifiers can comprise a nonionic surfactant, optionally wherein the nonionic surfactant comprises an alkoxylated fatty alcohol, even more optionally wherein the one or more emulsifier is characterized by an HLB value of from about 5 to about 20, optionally from about 8 to about 16.

The one or more emulsifiers can comprise a first emulsifier and a second emulsifier, wherein the second emulsifier is different from the first emulsifier, optionally wherein the first emulsifier is a linear nonionic surfactant, and/or optionally wherein the second emulsifier is a branched nonionic surfactant.

Fabric Softening

The fabric care benefit active agent can be a fabric softening active. The particles can comprise from about 5% to about 45% by weight quaternary ammonium compound. The quaternary ammonium compound can be an ester quaternary ammonium compound. The quaternary ammonium compound can be those described in United States Patent Publications 2019/0169538 A1, 2019/0169539 A1, 2019/0169777 A1, 2019/0169532 A1, 2019/0169533 A1, and 2019/0169534 A1. The quaternary ammonium compound can be di-(tallowoyloxyethyl)-N,N-methylhydroxyethylammonium methyl sulfate.

The fabric softening active can be a fatty amine. The particles can comprise from about 8% to 45% by weight fatty amine. The fatty amine can be those described in United States Patent Publication 2020/0354652 A1.

The fabric softening active can be a silicone. The particles can comprise from about 1% to about 45% by weight silicone. The silicone can be that as described in United States Patent Publication 2017/0349865.

Branched Polyester

The fabric care benefit active agent can be a branched polyester. The particles can comprise from about 5% to about 45% by weight a branched polyester. The branched polyester can be those described in United States Patent Publication 2019/0367841 A1. The branched polyester can be those described and claimed in United States Patent Publication 2019/0233764 A1.

Cationic Polymer

The fabric care benefit active agent can be a cationic polymer. The particles can comprise from about 0.1% to about 10% by weight cationic polymer. The cationic polymer can be selected from the group of cationic polysaccharide, Polyquaternium-4, Polyquaternium-6, Polyquaternium-7, Polyquaternium-10, Polyquaternium-22, Polyquaternium-67, and mixtures thereof. The cationic polysaccharide can be polymeric quaternary ammonium salt of hydroxyethylcellulose which has been reacted with an epoxide substituted with a trimethylammonium group.

Enzyme

The fabric care benefit active agent can be enzyme. The particles can comprise from about 0.0001% to about 5% by weight an enzyme. The enzyme can be selected from the group of protease, xyloglucanase, mannanase, and combinations thereof. The enzyme can be those described in United States Patent Publications 2017/0260481 A1 and 2017/0260482 A1.

Graft Copolymer

The fabric care benefit active agent can be a graft copolymer. The particles can comprise from about 0.1% to about 45% by weight a graft copolymer. The graft copolymer can those described in U.S. Patent Application 69/951,274. The graft copolymer can those described in U.S. Patent Application 69/722,492.

Antioxidant

The fabric care benefit active agent can be an antioxidant. The particles can comprise from about 0.1% to about 2% by weight antioxidant. The antioxidant can be dispersed in a matrix of said water soluble carrier. The antioxidant can those described in U.S. Patent Application 63/034,766. The antioxidant can be butylated hydroxytoluene.

Apparatus and Process for Forming Particles

An apparatus 1 for forming particles is shown in FIG. 1. The precursor material 20 can be a melt of any of the compositions disclosed herein for the particles 90. The precursor material 20 can comprise more than about 20% by weight water soluble carrier. The precursor material 20 can comprise more than about 20% by weight water soluble polymer. The precursor material 20 can comprise from about 20% to about 99% by weight water soluble carrier. The precursor material 20 can comprise from about 20% to about 99% by weight water soluble polymer.

The precursor material 20 can comprises more than about 20%, optionally more than about 40%, by weight polyethylene glycol having a weight average molecular weight from about 2000 Da to about 13000 Da and from about 0.1% to about 20% by weight perfume.

The raw material or raw materials can be provided to a batch mixer 10. The batch mixer 10 can have sufficient capacity to retain the volume of raw materials provided thereto for a sufficient residence time to permit the desired level of mixing and or reaction of the raw materials. The material leaving the batch mixer 10 can be the precursor material 20. Optionally, the precursor material can be provided to the feed pipe 40 from some other upstream mixing process, for example in-line mixing, in-line static mixing, and the like. The precursor material 20 can be a molten product. The batch mixer 10 can be a dynamic mixer. A dynamic mixer is a mixer to which energy is applied to mix the contents in the mixer. The batch mixer 10 can comprise one or more impellers to mix the contents in the batch mixer 10.

Between the batch mixer 10, which is optionally present, and the distributor 30, the precursor material 20 can be transported through the feed pipe 40. The feed pipe 40 can be in fluid communication with the batch mixer 10. One or more gas feed lines 155 can be provided in fluid communication with the feed pipe 40 downstream of the batch mixer 10. One or more gas feed lines 155 can be provided in fluid communication with the feed pipe 40 between the batch mixer 10 and the distributor 30. A mill 200 can be provided downstream of the one or more gas feed lines 155 and in line with the feed pipe 40. The mill 200 can be provided in line with the feed pipe 40 downstream of the one or more gas feed lines 155 and upstream of the distributor 30.

Optionally, a fully formulated precursor material that comprises the water soluble carrier and fabric care benefit active agent can be formed by employing in-line mixing so that the process is a continuous process. The fabric care benefit active agent can be continuously fed into the water soluble carrier to form the precursor material 20 that is further processed downstream. The precursor material 20 or partially formulated precursor material can be provided in the feed pipe 40 and the fabric care benefit active agent can be fed into the feed pipe 40 and mixed with the partially formulated precursor material to form the precursor material 20.

The precursor material 20 can be provided to the feed pipe 40. The feed pipe 40 is the conveyance by which the precursor material 20 is carried. The feed pipe 40 includes the conveyance between elements of the apparatus 1 and the conveyance through which the precursor material is carried within components of the apparatus 1. For instance, the mill 200 may be provided in a unit with a portion of the conveyance approaching the mill 200 and a portion of the conveyance exiting the mill 200. Each of these portions is part of the feed pipe 40. So, the feed pipe 40 can be viewed the entire conveyance between the batch mixer 10 and the distributor 30 and the feed pipe 40 is interrupted by various elements such as the one or more gas feed lines 155, the mill 200, intermediate mixer 50, and feed pump 140. In absence of a batch mixer 10 upstream of the feed pipe 40, the feed pipe 40 can be viewed the entire conveyance upstream of the distributor 30 and the feed pipe 40 is interrupted by various elements such as the one or more gas feed lines 155, the mill 200, intermediate mixer 50, and feed pump 140.

An intermediate mixer 55 can be provided downstream of the mill 200 and in line with feed pipe 40. The intermediate mixer 55 can be a static mixer 50. The intermediate mixer 55 can be in fluid communication with the feed pipe 40 between the mill 200 and the distributor 30. The intermediate mixer 55, which can be a static mixer 50, can be downstream of the batch mixer 10. Stated otherwise, the batch mixer 10 can be upstream of the intermediate mixer 55 or static mixer 55 if employed. The intermediate mixer 55 can be in-line with the feed pipe 40. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, North Carolina, United States of America. The intermediate mixer 55 can be a perforated disc mill, toothed colloid mill, or DIL Inline Homogenizer, available from FrymaKoruma, Rheinfelden, Switzerland. The static mixer 50 can be a helical static mixer. The static mixer 50 can be a Kenics 1.905 cm inside diameter KMS 6, available from Chemineer, Dayton, OH, USA.

Without being bound by theory, it is believed that an intermediate mixer 55, such as the static mixer 50, can provide for a more uniform temperature of the precursor material 20 within the distributor 30 or stator 100. At the downstream end of the intermediate mixer 55, or static mixer 50 if used, the temperature of the precursor material 20 within the feed pipe 40 across a cross section of the feed pipe 40 orthogonal to the direction of flow can vary by less than about 10° C., or less than about 5° C., or less than about 1° C., or less than about 0.5° C.

In absence of a static mixer 50, the temperature across a cross section of the feed pipe 40 orthogonal to the direction of flow may be non-uniform. The temperature of the precursor material 20 at the center line of the feed pipe 40 may be higher than the temperature of the precursor feed material 20 at the peripheral wall of the feed pipe 40. When the precursor material 20 is discharged to the distributor 30 or stator 100, the temperature of the precursor material 20 may vary at different positions within the distributor or stator 100. Without being bound by theory, it is thought that by providing for a uniform temperature across the cross section of the feed pipe 40 by employing a static mixer 50 as described herein, more uniform particles 90 can be produced as compared to an apparatus 1 that does not have a static mixer 50.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The precursor material 20 can be deposited on the moving conveyor 80 when the conveyor 80 is in motion. The conveyor 80 can be moveable in translation relative to the distributor 30. The conveyor 80 can be a continuously moving conveyor 80. The conveyor 80 can be an intermittently moving conveyor 80. A continuously moving conveyor 80 may provide for higher processing speeds. An intermittently moving conveyor 80 can provide for improved control of the shape of the particles 90 that are produced.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

Figure 2:
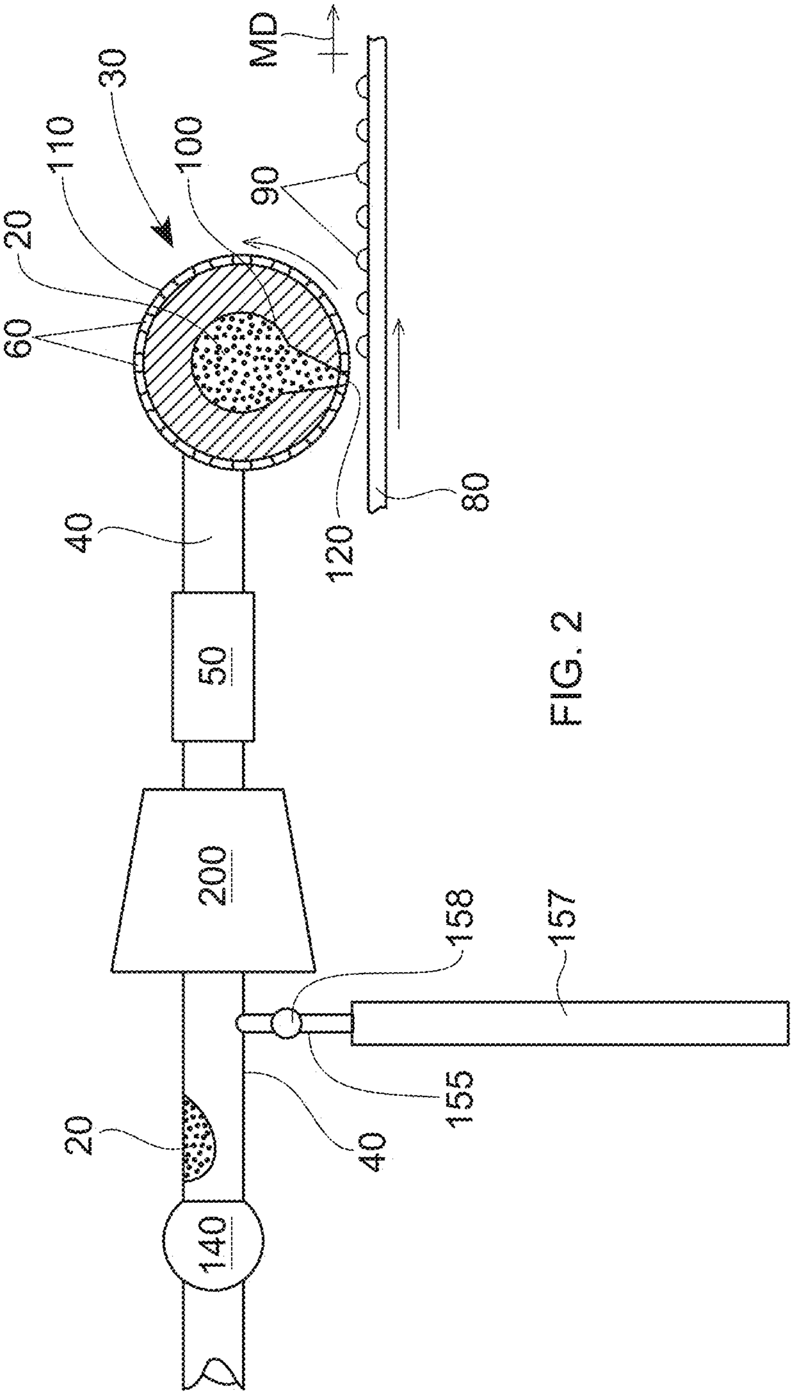
FIG. 2 is a portion of an apparatus for forming particles.

The distributor 30 can be a cylinder 110 rotationally mounted about a stator 100 with the stator being in fluid communication with the feed pipe 40 and the cylinder 110 can have a periphery 120 and there can be a plurality of apertures 60 in the periphery 120, as shown in FIG. 2. So, the apparatus 1 can comprise a stator 100 in fluid communication with the feed pipe 40. The feed pipe 40 can feed the precursor material 20 to the stator 100 after the precursor material 20 has passed through the mill 200.

The apparatus 1 can comprise a cylinder 110 rotationally mounted about the stator 100. The stator 100 is fed precursor material through one or both ends 130 of the cylinder 110. The cylinder 110 can have a longitudinal axis L passing through the cylinder 110 about which the cylinder 110 rotates. The cylinder 110 has a periphery 120. There can be a plurality of apertures 60 in the periphery 120 of the cylinder 110.

As the cylinder 110 is driven to rotate about its longitudinal axis L, the apertures 60 can be intermittently in fluid communication with the stator 100 as the cylinder 110 rotates about the stator 100. The cylinder 110 can be considered to have a machine direction MD in a direction of movement of the periphery 120 across the stator 100 and a cross machine direction on the periphery 120 orthogonal to the machine direction MD. The stator 100 can similarly be considered to have a cross machine direction CD parallel to the longitudinal axis L. The cross machine direction of the stator 100 can be aligned with the cross machine direction of the cylinder 110. The stator 100 can have a plurality of distribution ports 122 arranged in a cross machine direction CD of the stator 100. The distribution ports 122 are portions or zones of the stator 100 supplied with precursor material 20.

In general, precursor material 20 can be fed past the one or more gas feed lines 155 through the mill 200 and feed pipe 40 to the stator 100. The stator 100 distributes the precursor feed material 20 across the operating width of the cylinder 110. As the cylinder 110 rotates about its longitudinal axis L, precursor material 20 is fed through the apertures 60 as the apertures 60 pass by the stator 100. A discrete mass of precursor material 20 is fed through each aperture 60 as each aperture 60 encounters the stator 100. The mass of precursor material 20 fed through each aperture 60 as each aperture 60 passes by the stator 100 can be controlled by controlling one or both of the pressure of the precursor material within the stator 100 and the rotational velocity of the cylinder 110 or optionally controlling the viscosity of the precursor material 20 by controlling the temperature of the precursor material 20.

Drops of the precursor material 20 are deposited on the conveyor 80 across the operating width of the cylinder 110. The conveyor 80 can be moveable in translation relative to the longitudinal axis L of the cylinder 110. The velocity of the conveyor 80 can be set relative to the tangential velocity of the cylinder 110 to control the shape that the precursor material 20 has once it is deposited on the conveyor 80. The velocity of the conveyor 80 can be the about the same as the tangential velocity of the cylinder 110.

As shown in FIG. 1, flow of the precursor material 20 through the feed pipe 40 can be provided by gravity driven flow from a batch mixer 10 and the distributor 30. To provide for more controllable manufacturing, the apparatus 1 can be provided with a feed pump 140, as shown in FIG. 2. The feed pump 140 can be in line with the feed pipe 40, with in line meaning in the line of flow of the precursor material 20. The feed pump 140 can between the batch mixer 10 and the distributor 30. The feed pump 140 can be upstream of the distributor 30. If a stator 100 is employed, the feed pump 140 can be in line with the feed pipe 40, with in line meaning in the line of flow of the precursor material 20. If a stator 100 is employed, the feed pump 140 can be between the batch mixer 10 and the stator 100. The feed pump 140 can be upstream of the stator 100. In describing the position of the feed pump 140, between is used to describe the feed pump 140 being in-line downstream of the batch mixer 10 and upstream of the distributor 30 or if used, upstream of the stator 100.

The one or more gas feed lines 155 and the mill 200 can be positioned in line between the feed pump 140 and the distributor 30 or stator 100, if employed in the apparatus 1.

The flow rate of the precursor material 20 can be about 3 L/min. The precursor material 20 can be a molten material comprising any of the compositions described herein for the precursor material 20 or particles 90.

The apparatus 1 can comprise one or more gas feed lines 155. A single gas feed line 155 can be practical if the gas to entrained into the precursor material can be practically supplied via a single gas feed line 155. As described herein, a gas comprising multiple constituents can be desirable. Multi-constituent gasses can be provided in a single container 157. For example, a mixture of carbon dioxide and nitrogen can be provided in a gas cylinder. Optionally, mixtures of gasses can be provided continuously from the environment via a reaction process or by combining air with another gas sourced from a container. The gas can be pressurized via a compressor.

The one or more gas feed lines 155 can comprise a flow regulator 158. The flow regulator 158 can regulate the flow of gas into the feed line 40. The volume of gas added per unit volume of precursor material 20 can be controlled by setting the flow regulator 158 to the desired flow rate. The more gas fed into the precursor material 20 within the feed line 40, the more gas that will be contained in the particles 90. The one or more gas feed lines 155 can provide for entraining gas into the precursor material 20.

The flow regulator 158 can be Key Instruments Flo-Rite Series GS 65 mm flowmeter, part number 60410-R5. The feed line 40 can be a 1.5 inch inside diameter stainless steel sanitary pipe. The gas feed line 155 can be a 0.25 inch inside diameter polyethylene tubing. Gas can be provided in the gas feed line 155 at a pressure greater than about 4 bar, for example 5.9 bar.

If two or more gas feed lines 155 are separately connected to the feed pipe 40, a flow regulator can be provided along each gas feed line 155 to regulate the flow of gas in each respective gas feed line 155. If a mixture of gas is introduced into the feed pipe 40 via a single gas feed line 155, a single flow regulator 158 can be practical.

At the connection between a gas feed line 155 and the feed pipe, an injection quill device for introducing the gas can be provided.

The gas can be provided at a temperature and pressure such that when the gas reaches ambient temperature and pressure the desired volume of gas is present in the particles 90. The Ideal Gas Law can be used to determine the desired temperature and pressure of delivery. The gas can also comprise water. The water can be in gaseous or liquid form. The quantity of water in the gas can be selected to be at the desired level.

The mill 200 can be a rotor-stator type mill. The mill can be a Quadro Z1 in-line mixer with a single stage of medium rotor stators, operated at about 400 RPM.

The mill 200 and the one or more gas feed lines 155 can be combined in a single unit.

An Oakes Foamer (E.T. Oakes Corporation, 686 Old Willets Path, Hauppauge, NY 11788) 2MT1A continuous foamer) can be used to provide a gas feed line 155, flow regulator 158 and mill 200 in a single unit.

Figure 3:
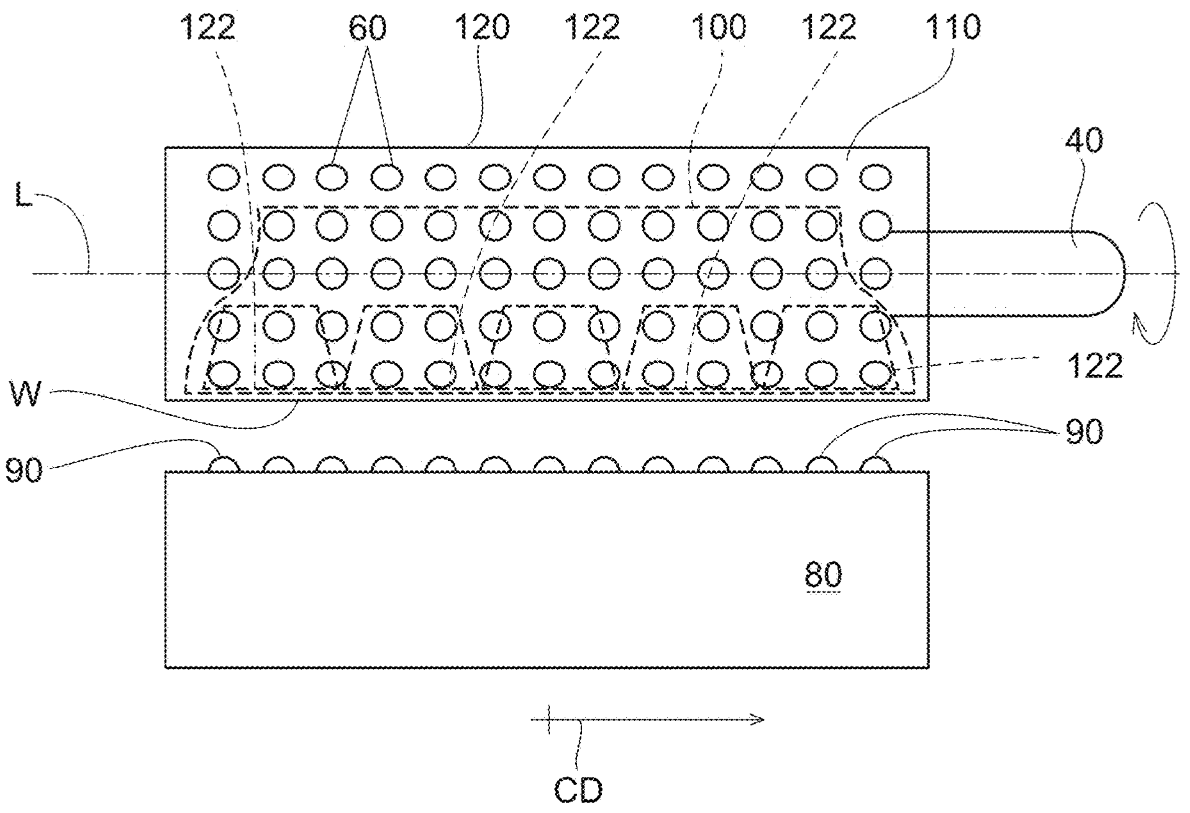
FIG. 3 is an end view of an apparatus for forming particles.

A view of an apparatus 1 in the machine direction MD is shown in FIG. 3. As shown in FIG. 3, the apparatus 1 can have an operating width W and the cylinder 110 can rotate about longitudinal axis L.

The apparatus 1 for forming particles 90 can comprise: a feed pipe; one or more gas feed lines 155 mounted in fluid communication with the feed pipe 40 downstream of the batch mixer 10; a mill 200 downstream of the one or more gas feed lines 155 and in line with the feed pipe 40; and a distributor 30 downstream of the mill 200 and fluid communication with said feed pipe 40, wherein said distributor 30 comprises a plurality of apertures 60. The apparatus 1 can comprise a conveyor beneath the distributor 30 and movable in translation relative to the distributor 30. The distributor 30 can comprise a stator 100 in fluid communication with the feed pipe 40. The distributor 30 can comprise a cylinder 110 rotationally mounted about the stator 100 and rotatable about a longitudinal axis L of the cylinder 110. The cylinder 110 can have a periphery 120 and the cylinder 110 can have a plurality of apertures 60 disposed about the periphery 120. The apertures 60 can be intermittently in fluid communication with the stator 100 as the cylinder 110 rotates about the stator 100. The apparatus can comprise a conveyor 80 beneath the cylinder 110 and the conveyor 80 can be movable in translation relative to the longitudinal axis L. The apparatus 1 for forming particles 90 can comprise a batch mixer 10. The feed pipe 40 can be in fluid communication with the batch mixer 10.

The process for forming particles 90 can comprise the steps of: providing a precursor material 20 to a feed pipe 40; entraining gas into the precursor material 20, wherein the gas comprises from about 50% to about 75% carbon dioxide and from about 25% to about 50% other constituents; providing a distributor 30 having a plurality of apertures 60; transporting the precursor material 20 from the feed pipe 40 to the distributor 30; passing the precursor material 20 through the apertures 60; providing a movable conveyor 80 beneath the apertures 60; depositing the precursor material 20 on to the movable conveyor 80; and cooling the precursor material 20 to form a plurality of particles 90.

The gas can be entrained in the precursor material 20 as a mixture of gasses. For example the mixture of gasses can directed into the precursor material 20 via a single gas feed line 155. The mixture of gasses can comprise from about 50 vol % to about 75 vol % carbon dioxide and from about 25 vol % to about 50 vol % other constituents. The mixture can be provided from a container 157 containing the mixture of gasses. For example, the container 157 can be a gas cylinder that is filled with the desired gas, which is a mixture of different gasses.

Figure 4:
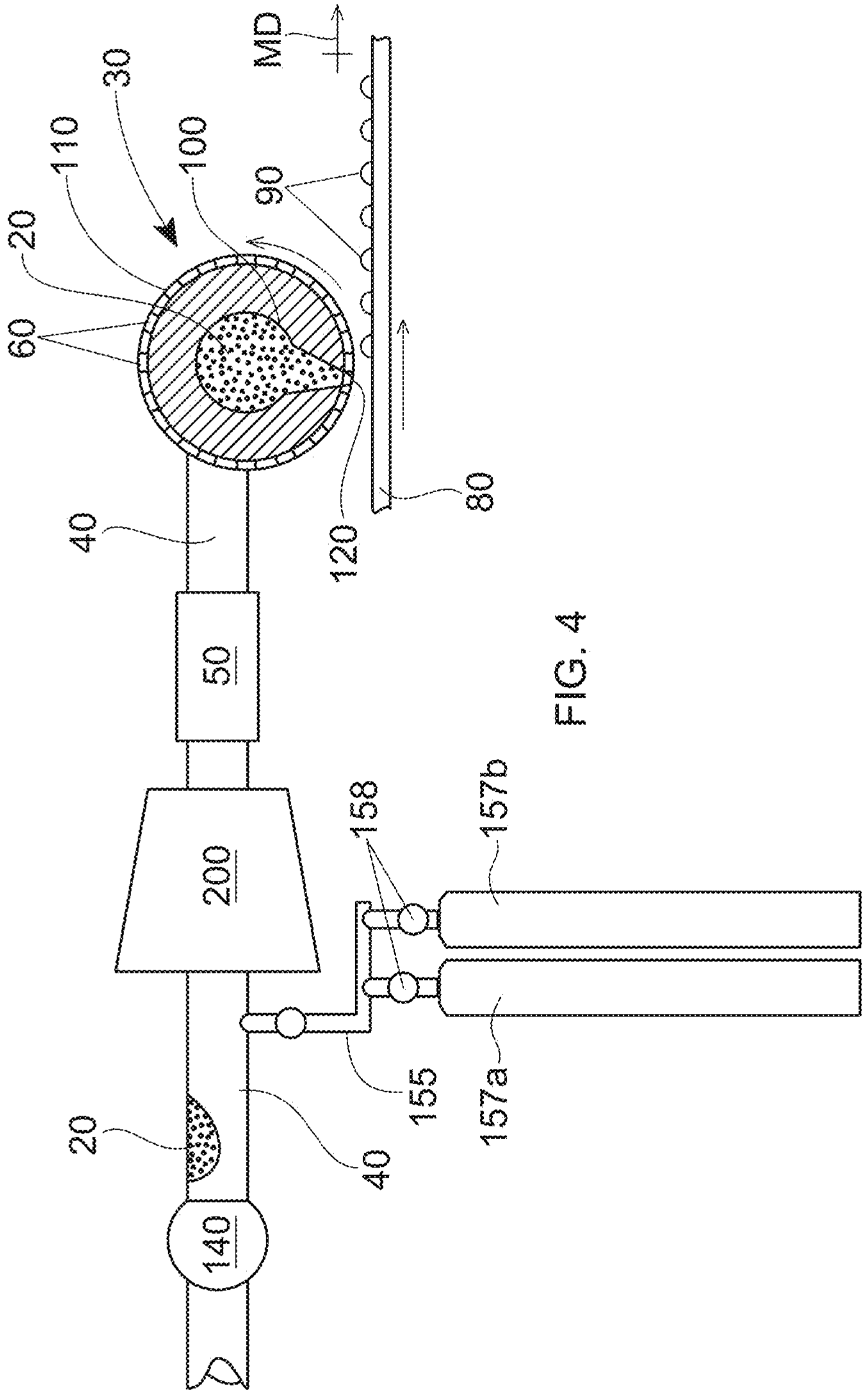
FIG. 4 is a portion of an apparatus for forming particles.

Optionally, the carbon dioxide can be provided from a primary container 157*a* and the other constituents of the gas can be provided from one or more secondary container 157*b* (FIG. 4). The primary container 157*a* and secondary container 157*b* can feed into a single gas feed line 155. Flow regulators 158 can control the flow of gas from the primary container 157*a* and secondary container 157*b* into the gas feed line 155. Optionally, an inline mixer can be provided in or upstream of the gas feed line 155 to mix the gasses from the primary container 157*a* and the secondary container 157*b*.

The primary container 157*a* can contain the carbon dioxide. The other constituents of the gas can be provided from the secondary container 157*b*. The other constituents of the gas can be provided as air from the secondary container 157*b*. Containers of air are readily available commercially. Similarly containers of carbon dioxide are readily available commercially. The operator of the apparatus 1 can acquire a cylinder of carbon dioxide and a cylinder of air and set the flow regulators 158 to provide the desired gas. The carbon dioxide and the other constituents of the gas can be combined into a single flow of the gas prior to being entrained into the precursor material 20.

Optionally, the primary container 157*a* can feed into a primary gas feed line 155 and the secondary container 157*b* can feed into a secondary gas feed line 155. Gas flow within each gas feed line 155 can be regulated by a flow regulator 158 dedicated to such gas feed line 155.

In operation, it can be practical to provide the precursor material 20 in the feed pipe at an operating pressure from about 2 bars to about 8 bars. The gas can be fed into the feed pipe at pressure above the operating pressure of the feed pipe 40. The gas, or the carbon dioxide constituent thereof, can be entrained at a pressure greater than about 3 to about 4 bars, or even greater than about 4 bars, or even greater than about 5 bars.

The solubility of carbon dioxide in the precursor material 20 can be greater than the solubility of the majority by volume of other constituents of the gas. When carbon dioxide gas is fed into the stream of precursor material 20 that is at the operating pressure, the carbon dioxide solubilizes into the precursor material 20. Other constituents of the gas may or may not solubilize into the precursor material 20 at the operating pressure. Those constituents that have a low solubility in the precursor material 20 relative to the carbon dioxide predominantly remain as bubbles in the precursor material 20.

As the precursor material 20 passes through the apertures 60, the pressure drops towards or to atmospheric pressure.

The precursor material 20 may also begin to cool. The precursor material 20 may continue to cool as the precursor material 20 travels from the apertures 60 to the movable conveyor 80. Cooling continues after the precursor material 20 is deposited on the movable conveyor 80. Heat is removed from the precursor material 20 by the conveyor and the belt facing side of the precursor material 20 in contact with the movable conveyor 80 begins to solidify. Similarly the surface of the precursor material 20 continues to cool after the precursor material 20 is deposited on the movable conveyor 80. As such, cooling of the precursor material 20 once deposited on the movable conveyor 80 is a three dimensional time dependent process.

As the molten precursor material 20 cools, a solidification front develops from the belt facing side of precursor material 20 and the solidification front advances away from the moveable conveyor 80 over time. The air facing side of the precursor material 20, which is away from the belt facing surface of the precursor material, also cools as a function of time. This results in a solidification front advancing from the air facing surface towards the center of the particle being formed on the moveable conveyor 80 as the precursor material 20 cools.

If the gas entrained in the precursor material 20 is air, which is about 78 vol % nitrogen, about 21 vol % oxygen, about 0.93 vol % argon, and about 0.03 vol % carbon dioxide, most of that gas has limited solubility into the precursor material 20 and the air remains as bubbles in the precursor material 20 throughout the process of making particles. This can limit the amount of air that can be entrained in the precursor material 20 and still make particles having the desired stability and appearance. After the precursor material 20 is deposited on the moveable belt 40, the buoyancy of the air bubbles in the precursor material 20 and the solidification front advancing from the belt facing side of the precursor material 20 tends to drive some of the air bubbles away from the movable conveyor 80. As the air bubbles are driven upwardly, they may coalesce to form larger air bubbles. Some of the air bubbles may escape through the air facing side of the precursor material 20. Escaped air bubbles no longer contribute to the porosity of the particles 90. If a skin layer has formed on the air facing side of the precursor material 20, air bubbles may erupt through the skin layer which can result in particles 90 that have a physically unstable outer surface. A physically unstable outer surface is undesirable as that can result in the particles being subject to flaking and make the particles messy to use.

The problem with using air as the gas to be entrained is that the air bubbles exist in the precursor material 20 when the precursor material 20 is deposited onto the moveable belt 40 and the phenomena described in the preceding paragraph occur, which can result in unsatisfactory particles 90. Surprisingly, using a gas that comprises from about 50 vol % to about 75 vol % carbon dioxide can improve the ability of the precursor material 20 to retain bubbles as the precursor material 20 cools on the movable conveyor 80 to form particles 90. That can result in particles 90 that have a higher porosity and fewer large bubbles at or near the air facing surface of the particles 90.

Carbon dioxide can be relatively soluble in the precursor material 20 as compared to other gas constituents. The gas constituents that are relatively insoluble in the precursor material 20 may be present as bubbles. When the operating pressure on the precursor material is released to or towards ambient pressure, the carbon dioxide comes out of solution. The process of the carbon dioxide coming out of solution from the precursor material 20 is a time dependent process. The bubbles of gas constituents that are relatively insoluble in the precursor material 20 may serve as nucleation sites for the carbon dioxide to come out of solution from the precursor material. While the carbon dioxide is coming out of solution, the precursor material 20 is also cooling. As described previously, a solidification front may develop from the belt facing side of the precursor material 20 and the air facing side of the precursor material 20 is also solidifying. The solidifying or solidified precursor material 20 forms a barrier to bubbles escaping from the precursor material 20. As the carbon dioxide gradually comes out of solution from the precursor material 20, bubbles of carbon dioxide may form and or the carbon dioxide may come out of solution into the existing bubbles of relatively insoluble gas constituents. The delayed formation of the carbon dioxide bubbles or the expansion of the existing bubbles of relatively insoluble gas constituents as the carbon dioxide nucleates on such bubbles allows for a greater volume of bubbles to be formed in the precursor material 20. These late formed bubbles are less likely to escape from the precursor material 20. Once the precursor material 20 has completely solidified, the formed particle 90 can have a large volume of voids.

The solidification fronts developed on the belt facing side of the precursor material 20 and the air facing side of the precursor material 20 and the late forming bubbles can also provide for the advantage that distribution of bubble sizes in the particles 90 is more uniform through the vertical profile of the particle 90 along the particle axis, vertical being taken to be in a direction orthogonal to the flat bottom. Having a relatively uniform bubble size throughout the particle can be advantageous in that there may not be a concentration of large bubbles near or at the top surface of the particles 90 or pock marks or craters in the top surface of the particles 90 that are evidence of bubbles that erupted through the surface of the particle 90. Bubbles at or near the surface of the particles 90 and pock marks and craters in the top surface of the particles 90 may structurally weaken the top surface of the particle and make the particles less physically stable. An irregular surface of the particles 90 may also be perceived by users as being indicative of poor manufacturing quality control that degrades the user's confidence in the quality and performance of the particles 90.

Particles

The particles 90 can be formed as described herein. The composition can comprise a plurality of individual particles 90. The individual particles 90 can be formed as described herein and can comprise about 20% to about 99% by weight water soluble carrier. The individual particles 90 can further comprise from about 0.1% to about 45% by weight fabric care benefit active agent, optionally from about 0.1% to about 20% by weight fabric care benefit active agent. Each of the particles can have a mass from about 5 mg to about 200 mg, optionally from about 10 mg to about 100 mg, optionally from about 20 mg to about 50 mg. The particles can have a hemispherical or compressed hemispherical shape.

Figure 5:
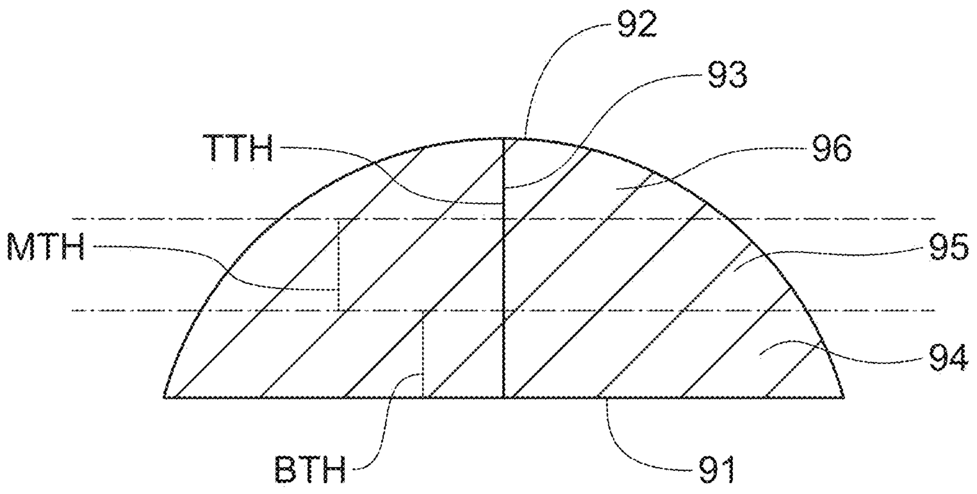
FIG. 5 is a cross section of a particle.

Each individual particle 90 can have a flat bottom 91, a rounded top 92, and a maximum height 93 orthogonal to the flat bottom 91 (FIG. 5). The maximum height 93 is a scalar quantity. Each of the particles 90 can comprise a porous bottom third 94, a porous middle third 95 above the bottom third 94, and a porous top third 96 above the middle third 95 and the bottom third 94. The middle third 95 is between the bottom third 94 and the top third 96. Each third of the particle 90 is a horizontal section of the particle 90, with horizontal being understood to be the flat bottom 91. Each horizontal section, or third, can have a section height that is one-third the maximum height 93. The bottom third 94 can have a bottom third section height BTH orthogonal to the flat bottom 91 that is one-third the maximum height 93. Similarly, the middle third 95 can have a middle third section height MTH orthogonal to the flat bottom 91 that is one-third the maximum height 93. And the top third 96 can have a top third section height TTH orthogonal to the flat bottom 91 that is one-third the maximum height 93. The bottom third section height BTH, middle third section height MTH, and top third section height TTH each have the same scalar magnitude.

Figure 6:
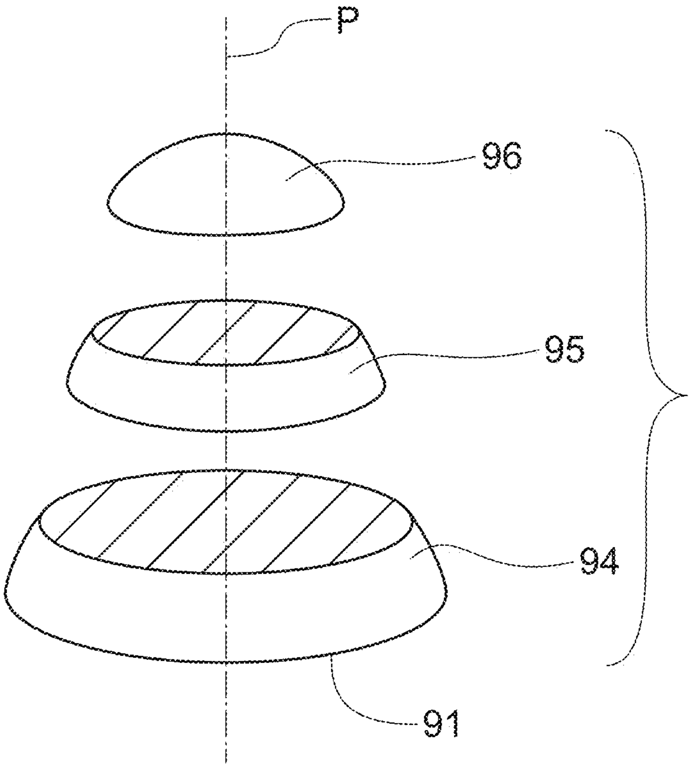
FIG. 6 is an exploded view of a particle.

The bottom third 94 can extend from the flat bottom 91 to a bottom third section height BTH orthogonal to the flat bottom 91 that is one-third the maximum height 93. The middle third 95 is above the bottom third 94 and extends from the bottom third 94 to a middle third section height MTH above the bottom third 94 that is one-third the maximum height 93. The top third 96 is above the middle third 95 and extends from the middle third 95 to a top third section height TTH above the middle third 95 that is one-third the maximum height 93. The scalar length of the bottom third section height BTH, middle third section height MTH, and top third section height TTH, are equal to one another. An exploded perspective view of a particle 90 is shown in FIG. 6.

The bottom third 94 can have a bottom third average pore radius. Similarly, the middle third 95 can have a middle third average pore radius. The top third 96 can have a top third average pore radius. The average pore radius of each third can be measured as described herein.

The bottom third average pore radius and the top third average pore radius can differ by less than about 15 μm. Such uniformity in the average pore radius amongst the top and bottom of the particles 90 can result in particles 90 that have the same or similar structural stability on the flat bottom 91 and the rounded top 92. Moreover, the luster of the flat bottom 91 and the rounded top 92 can be the same or similar enough to one another so that surface defects are not apparent to the user of the particles 90. When the bottom third average pore radius and the top third average pore radius are thus similar to one another, a large total volume of pores can be provided within each particle 90.

The bottom third average pore radius can be from about 5 μm to about 100 μm optionally from about 10 μm to about 50 μm, optionally about 30 μm. Similarly, the top third average pore radius can be from about 5 μm to about 100 μm, optionally from about 10 μm to about 50 μm, optionally about 30 μm. The middle third average pore radius can also be from about 5 μm to about 100 μm, optionally from about 10 μm to about 50 μm, optionally about 30 μm. Such sizes of pores within the particles 90 in these locations can provide for the ability to include a large total volume of voids in the particles 90 and the particles 90 can be structurally stable.

Each of the particles 90 can have a particle axis P. The particle axis P is orthogonal to the flat bottom 91 and passes through the bottom third 94, middle third 95, and top third 96. The middle third 95 can have a middle third average section pore radius that varies as a function of position along the particle axis P. The middle third average section pore radius can have a range less than about 30 μm, optionally less than about 20 μm.

Individual particles 90 can have a middle third 95 that has a middle third average pore radius that is greater than each of the bottom third average pore radius and the upper third average pore radius. Such particles 90 can tend to have larger pores constrained within the core of each of the particle 90 away from the outer surface of the particles 90. During manufacture, the solidification front that can form as the particles 90 cool can restrain movement of the bubbles within the solidifying particle 90 so that bubbles do not erupt through the outer surface of the particle 90. Having fewer large bubbles near the outer surface of the particle 90 can improve the physical stability of the particle and limit the number of scars on the surface of the particle 90 from eruptions of bubbles through the outer surface of the particle 90.

Each of the particles 90 can have a mass from about 5 mg to about 200 mg, optionally about 10 mg to about 100 mg, optionally from about 20 mg to about 50 mg. The particles can have a hemispherical or compressed hemispherical shape.

Each of the particles 90 can have a density less than about 1 $g/cm^3$, optionally less than about 0.95 $g/cm^3$, optionally less than about 0.92 $g/cm^3$, optionally less than about 0.9 $g/cm^3$. Particles 90 having a density less than about 1 $g/cm^3$ can have the tendency to float or remain suspended in the wash liquor for a long enough time for the particles 90 to dissolve completely during a wash cycle.

The particles 90 can have a hemispherical or compressed hemispherical shape. The individual particles 90 can have a flat bottom 91 that has a diameter from about 2 mm to about 5 mm or an area from about 3 $mm^2$ to about 20 $mm^2$. The individual particles 90 can have a maximum height from about 2 to about 5 mm.

Figure 7:
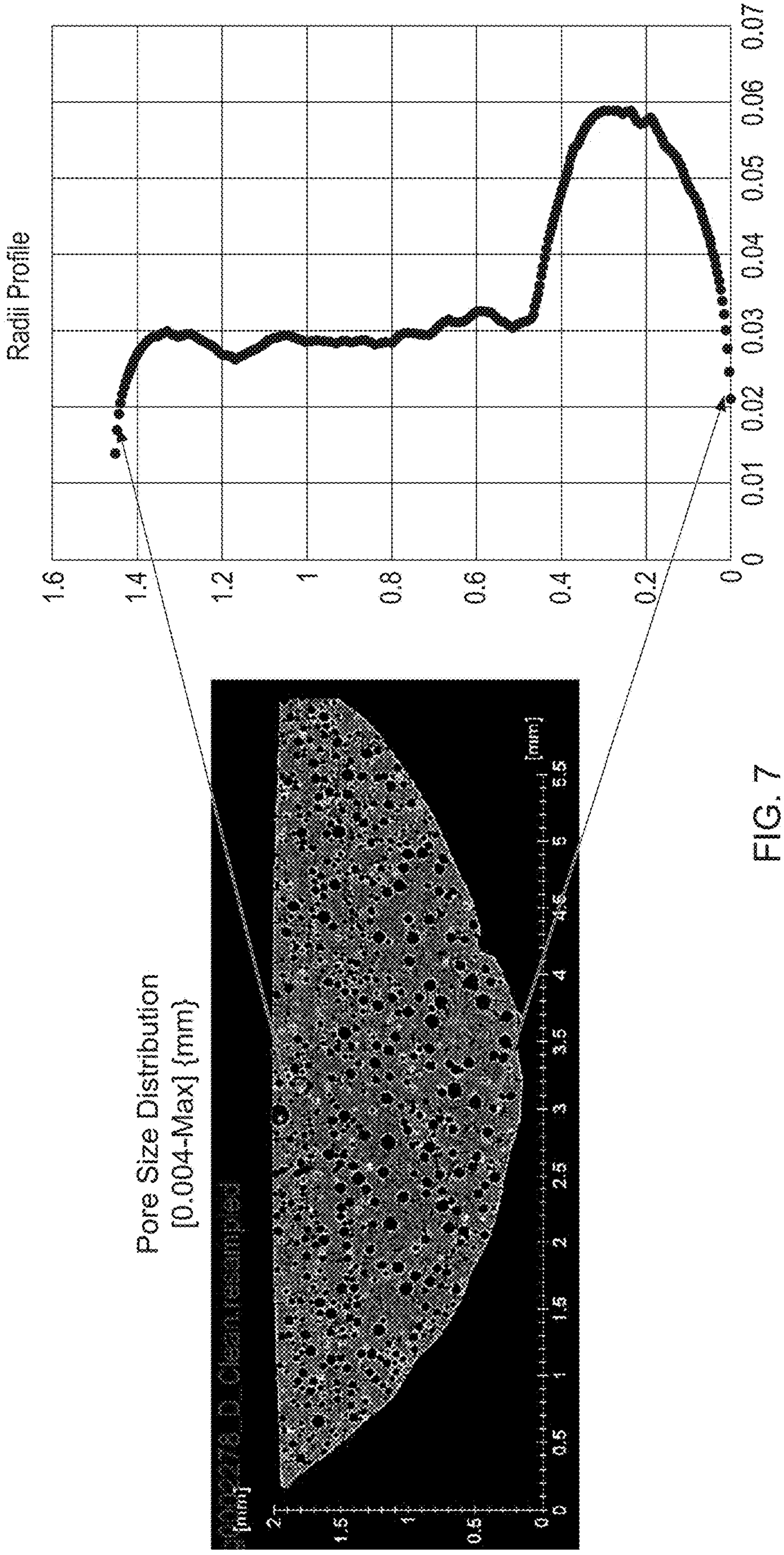
FIG. 7 is a micro-CT image of a particle formed using a process in which the included gas was air and a graph pf the average pore radius (Radii Profile in millimeters).

A micro-CT image particle 90 formed using a process in which the included gas was air is shown in FIG. 7. Also shown in FIG. 7 is a graph of the average pore radius (Radii Profile in millimeters) as a function of position (in millimeters) in the particle 90. In FIG. 7, the flat base 91 is at the top of the image and the rounded top 92 is at the bottom of the image. The top third 96 is towards the bottom of the image and graph shown in FIG. 7. The bottom third 94 is towards the top of the image and graph shown in FIG. 7. As shown in FIG. 7, the average pore radius (Radii Profile in millimeters) in the top third 96 of the particle 90 is substantially larger than that for the middle third 95 and the bottom third 94. For the particle shown in FIG. 7, there is a preponderance of large pores near the rounded top 92 of the particle 90.

Figure 8:
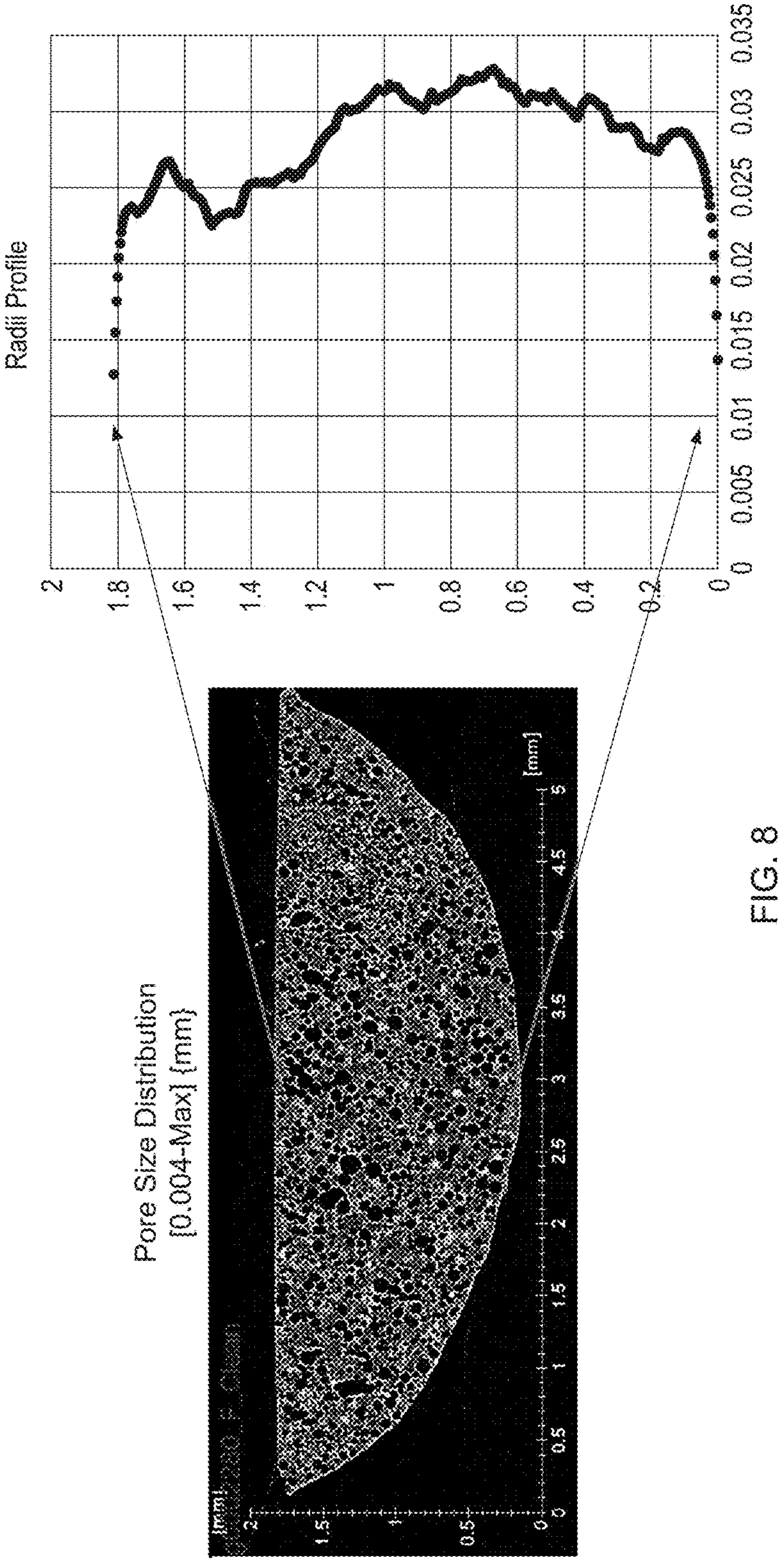
FIG. 8 is a micro-CT image of a particle formed using a process in which the included gas was a mixture of air and carbon dioxide and a graph pf the average pore radius (Radii Profile in millimeters).

A micro-CT image particle 90 formed using a process in which the included gas was a mixture of air and carbon dioxide (about 24% air which includes carbon dioxide and about 76% carbon dioxide) is shown in FIG. 8. Also shown in FIG. 8 is a graph of the average pore radius (Radii Profile in millimeters) as a function of position (in millimeters) in the particle 90. In FIG. 8, the flat base 91 is at the top of the image and the rounded top 92 is at the bottom of the image. The top third 96 is towards the bottom of the image and graph shown in FIG. 8. The bottom third 94 is towards the top of the image and graph shown in FIG. 8. As shown in FIG. 8, the average pore radius (Radii Profile in millimeters) in the top third 96 of the particle 90 and the bottom third 94 differ by less than 15 μm. Moreover, the average pore radius (Radii Profile in millimeters) of the middle third 95 is similar to that of the bottom third 94 and the top third 96. In general, the average pore radius of the particle 90 shown in FIG. 8 is smaller than that of the particle 90 shown in FIG. 7.

Particles 90 can be produced as follows. A 50 kg batch of precursor material 20 can be prepared in a mixer. Molten PEG8000 can be added to a jacketed mixer held at 70° C. and agitated with a pitch blade agitator at 125 rpm. Butylated hydroxytoluene can be added to the mixer at a level of about 0.01% by weight of the precursor material 20. A water based slurry of perfume microcapsules or other fabric care benefit active agent or agents, optionally a water based slurry of other fabric care benefit active agent or agents, can be added to the mixer at a level of from about 0.1% to about 45% by weight, optionally about 4% by weight of the precursor material 20. Optionally, unencapsulated perfume can be added to the mixer at a level of about 8% by weight of the precursor material 20. Dye can be added to the mixer at a level of about 0.01% by weight of the precursor material 20. The PEG can account for the balance by weight of the precursor material 20. The precursor material 20 can be mixed for 30 minutes.

The precursor material 20 can be formed into particles 90 on a SANDVIK ROTOFORM 3000 having a 750 mm wide 10 m long belt. The cylinder 110 can have 2 mm diameter apertures 60 set at a 10 mm pitch in the cross machine direction CD and 9.35 mm pitch in the machine direction MD. The cylinder can be set at approximately 3 mm above the belt. The belt speed and rotational speed of the cylinder 110 can be set at 10 m/min.

After mixing the precursor material 20, the precursor material 20 can be pumped at a constant 3.1 kg/min rate, or even a 4 kg/min rate, from the mixer 10 through a plate and frame heat exchanger set to control the outlet temperature to 50° C. The pressure in the feed pipe 40 downstream of the pump 140 can be about 2 to about 7 bar, and alternatively about 5.5 bar or about 5 bar, the pressure being in the feed pipe 40 downstream of the mill 200.

The gas can be entrained in the precursor material 20 at a volumetric flow rate ratio of precursor material to gas from about 1.3:1 to about 2.6:1, or even about 1.3:1 to about 1.6:1. The pressure of the gas in the gas feed line 155 must be higher than the pressure in the feed pipe 40 to ensure flow and entrainment of gas into the precursor material 20. The flow rate for the precursor material 20 can be about 4.5 liters per minute, and the gas flow rate may be about 3.4 liters per minute. The gas can be a mixture of carbon dioxide and other insoluble gases.

The precursor material 20 having the gas entrained therein can be passed through a Quadro Z1 mill with medium rotor/stator elements. After milling, the precursor material can optionally be passed through a Kenics 1.905 cm KMS 6 static mixer 50 installed 91.44 cm upstream of the stator 100 of the rotoforming device.

Packaging

Figure 9:
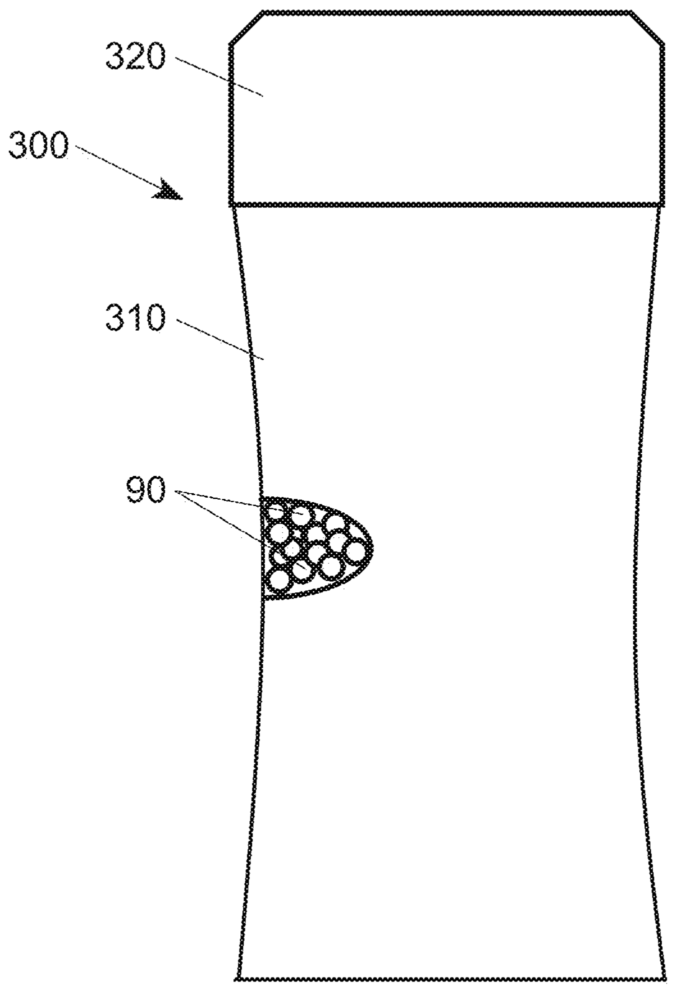
FIG. 9 is a container containing a plurality of individual particles.

The particles 90 can be contained in a package 300 (FIG. 9). The package 300 can contain from about 100 g to about 2000 g of particles 90. The package 300 can comprise body 310 and a closure 320. The particles 90 can be contained in the body 310 of the package 300. The closure 320 can be a removable closure. The body 310 can be a tube, a tub, a carton, a bottle, a sachet, or the like. The body 310 and closure 320 can be selected from the group of paperboard, corrugate, plastic, plastic film, paper, foil, and glass. The closure 320 can be flip top closure, a screw on closure, a slide on closure, a plug closure, an adhesive closure, an interlocking closure, or the like.

Method of Using Particles

The particles 90 can be used in a process for treating laundry comprising a step of dosing to a laundry washing machine or a laundry wash basin from about 10 g to about 50 g of the packaged composition. The particles 90 can be any of the particles disclosed herein. The process for treating laundry can include a step of dispensing the particles 90 from the package 300 into dosing cup. The particles 90 contained in the dosing cup can be dosed to the laundry washing machine or laundry wash basin. Water can be added to the laundry washing machine or laundry wash basin. During the wash cycle or handwashing, the particles 90 can dissolve in the water or wash liquor and the fabric care benefit active agents contained in the particles can contact the laundry being treated.

Micro-CT (Micro Computed Tomography) Measurement Methods

Micro-CT is used to measure various properties of individual particles, which properties included void volume-size and -spatial distribution. Structural measurements are based on analysis of a 3D x-ray sample-images obtained on high energy micro-CT instrument capable of acquiring a dataset at high isotropic spatial resolution. A suitable instrument is the Scanco μCT 50 available from Scanco Medical AG, Switzerland, or equivalent. The micro-CT instrument is a cone beam microtomograph with a shielded cabinet. A maintenance free x-ray tube is used as the source with an adjustable diameter focal spot. The polychromatic x-ray beam passes through the sample and some of the x-rays are attenuated by the particle chemical and physical properties. The extent of attenuation correlates to the mass of material, structure distribution and overall elemental composition that the x-rays must pass through. The transmitted/attenuated x-rays continue to the digital detector array and generate a 2D projection image of the particle. A 3D volume of the sample is generated by collecting several individual 2D projection images of the particle as the particle is rotated (180 to 360 degrees), which are then reconstructed into a single 3D image. The instrument is interfaced with a computer having dedicated software to control the image acquisition and reconstruction of the raw data into the 3D image. The 3D image is then analyzed using image analysis software (suitable image analysis software are: MATLAB available from The Mathworks, Inc., Natick, MA, and Avizo Lite available from Visualization Sciences Group/FEI Company, Burlington, MA, or equivalents).

Particle Preparation:

An individual particle is obtained randomly from a larger population of particles, excluding broken and chipped particles. The particle is held in place by low-density foam inside a low-density plastic holder that is placed inside the scanning chamber. The particle remains in this original configuration throughout the scanning process.

Image Acquisition:

The micro-CT instrument is set up and calibrated according to the manufacturer's specifications. The particle is placed inside a 9-mm diameter holder between two rings of low-density material to prevent movement while scanning rotations. The particle is placed upright and vertical to the scanner detector. A single 3D dataset of contiguous 2.0 μm (microns) isotropic voxels is collected. Images are acquired with the source at 45 kVp and 177 μA with no additional low energy filter. These current and voltage settings are optimized to produce the maximum contrast in the projection data with sufficient x-ray penetration through the sample, but once optimized, settings are held constant for all substantially similar particles. A total of 2000 projection images are obtained with an integration time of 550 ms and 3 averages for a single batch. Two vertical batches are implemented to scan the complete particle height. The projection images are reconstructed into a 3D dataset of about 4700 cross-sections having an isotropic spatial resolution of 2 μm (microns) and saved in 16-bit RAW format to preserve the full detector output signal for analysis.

The 3D dataset is loaded into the image analysis software and trimmed (cropped) to remove the surrounding holder and excess void/background space, thus creating a smaller 3D volume of interest for data processing and analysis. This trimmed 3D image is scaled from 16-bit to 8-bit, and thresholded using Otsu's method, which calculates the threshold level that minimizes the weighted intra-class variance, to separate and remove the background signal due to air, but maintain the signal from the solid material within the particle image.

A connected component plus region-growing algorithm (region-growing: with a seed point, the largest connected volume that contains the seed-voxel itself and all voxels with gray values inside a defined range is selected. Connected voxels are those sharing at least one face.) is executed which identifies the largest object and removes noise.

The total void space (void voxels) and total solid space (solid voxels) occupied within the sample structure in the 3D image are used to calculate the percent void space fraction and percent solid space fraction. A "total volume" mask is used to engulf the complete sample structure; this mask is accomplished by implementing a closing method implementing dilation followed by erosion operations on the solid fraction of the sample. Porosity is void space divided by total volume.

To characterize pore-size distribution in the height-direction, a Local Thickness Map algorithm, or LTM, is implemented in the void-voxels. The LTM method starts with a Euclidean Distance Mapping (EDM) which assigns grey level values equal to the distance each void voxel is from its nearest boundary. Based on the EDM data, the 3D void space representing pores is tessellated with spheres sized to match the EDM values. Voxels enclosed by the spheres are assigned the radius value of the largest sphere. In other words, each void voxel is assigned the radial value of the largest sphere that both fits within the void space boundary and includes the assigned voxel. The 3D labelled sphere distribution output from the LTM data scan can be treated as a stack of two-dimensional images in the height direction (direction of particle axis) and used to estimate the change in sphere diameter from slice to slice in the height direction. The depth of the mapped region is divided into three horizontal sections, the bottom third, middle third, and top third. The weighted-average average radii of all spheres that represent void voxels is calculated, and reported as average pore radius to the nearest 0.01 micron for each of the bottom third, middle third, and top third. Within the middle third, the middle third average section pore radius as a function of position along the particle axis is the change in sphere diameter from slice to slice in the height direction. The middle third average section pore radius as a function of position along the particle axis is calculated and recorded and the range of the middle third average pore radius is recorded.

Combinations

An Example is Below:

A. A composition comprising a plurality of individual particles (90), wherein said individual particles comprise:
   - about 20% to about 99% by weight water soluble carrier; and
   - about 0.1% to about 45% by weight fabric care benefit active agent;
   - wherein said individual particles have a flat bottom (91), a rounded top (92), and a maximum height (93) orthogonal to said flat bottom;
   - wherein said individual particles have a porous bottom third (94) extending from said flat bottom to a bottom third section height (BTH) above said flat bottom that is one-third said maximum height and said bottom third has a bottom third average pore radius;
   - wherein said individual particles have a porous middle third (95) above said bottom third and extending from said bottom third to a middle third section height (MTH) above said bottom third that is one-third of said maximum height;
   - wherein said individual particles have a porous top third (96) above said middle third and extending from said middle third to a top third section height (TTH) above said middle third that is one-third of said maximum height and said top third has a top third average pore radius;
   - wherein said bottom third average pore radius and said top third average pore radius differ by less than about 15 μm; and
   - wherein each of said particles has a mass from about 5 mg to about 200 mg, optionally from about 10 mg to about 100 mg, optionally from about 20 mg to about 50 mg.

B. The composition according to Paragraph A, wherein said individual particles have a hemispherical or compressed hemispherical shape.

C. The composition according to Paragraph A or B, wherein said bottom third average pore radius and said top third average pore radius are from about 5 μm to 100 μm.

D. The composition according to any of Paragraphs A to C, wherein said middle third has a middle third average pore radius from about 5 μm to 100 μm.

E. The composition according to any of Paragraphs A to D, wherein said middle third has a middle third average pore radius that is greater than each of said bottom third average pore radius and said upper third average pore radius.

F. The composition according to any of Paragraphs A to E, wherein each of said individual particles has a particle axis (P) orthogonal to said flat bottom and passing through said middle third and a middle third average section pore radius that varies as a function of position along said particle axis, wherein said middle third average section pore radius has a range less than about 30 μm.

G. The composition according to any of Paragraphs A to F, wherein each of said individual particles has a density less than about 1 $g/cm^3$.

H. The composition according to any of Paragraphs A to G, wherein said fabric care benefit active agent is selected from the group of an amine, a surfactant system, nonionic surfactant, a water-binding agent, a sulfite, fatty acid and/or salt thereof, enzyme, encapsulated benefit agent, soil release polymer, hueing agent, builder, chelating agent, dye transfer inhibiting agent, dispersant, enzyme stabilizer, catalytic material, bleaching agent, bleach catalyst, bleach activator, polymeric dispersing agent, cyclodextrin complexed benefit agent, soil removal/anti-redeposition agent, encapsulated perfume, polymeric dispersing agent, polymeric grease cleaning agent, brightener, suds suppressor, dye, hueing agent, unencapsulated perfume, structure elasticizing agent, fabric softening agent, quaternary amine, hard and soft tallow, hydrotrope, organic solvent, anti-microbial agent and/or preservative, neutralizer and/or pH adjusting agent, processing aid, filler, antioxidant, rheology modifier or structurant, opacifier, pearlescent agent, pigment, anti-corrosion and/or anti-tarnishing agent, and mixtures thereof.

I. The composition according to any of Paragraphs A to H, wherein said fabric care benefit active agent is unencapsulated perfume or encapsulated perfume.

J. The composition according to any of Paragraphs A to I, wherein said water soluble carrier is selected from the group of polyethylene glycol, sodium acetate, sodium bicarbonate, sodium chloride, sodium silicate, polypropylene glycol polyoxoalkylene, polyethylene glycol fatty acid ester, polyethylene glycol ether, polyglycerol esters, sodium sulfate, carbohydrates, starch, and mixtures thereof.

K. The composition according to any of Paragraphs A to J, wherein said water soluble carrier comprises polyethylene glycol having a weight average molecular weight from about 2000 Da to about 15000 Da.

L. The composition according to any of Paragraphs A to I, wherein said water soluble carrier is selected from the group of polyethylene glycol having a weight average molecular weight from 2000 Da to 15000 Da, polypropylene glycol, and combinations thereof.

M. The composition according to any of Paragraphs A to I, wherein said water soluble carrier is a block copolymer having Formulae (I), (II), (III) or (IV), $$R^1O\text{-}(EO)x\text{-}(PO)y\text{-}R^2 \quad (I),$$

$$R^1O—(PO)x\text{-}(EO)y\text{-}R^2 \quad (II),$$

$$R^1O\text{-}(EO)o\text{-}(PO)p\text{-}(EO)q\text{-}R^2 \quad (III),$$

$$R^1O—(PO)o\text{-}(EO)p\text{-}(PO)q\text{-}R^2 \quad (IV),$$

or a combination thereof;

wherein EO is a $—CH_2CH_2O—$ group, and PO is a $—CH(CH_3)CH_2O—$ group;

$R^1$ and $R^2$ independently is H or a C1-C22 alkyl group;

x, y, o, p, and q independently is 1-100;

provided that the sum of x and y is greater than 35, and the sum of o, p and q is greater than 35;

wherein said block copolymer has a weight average molecular weight ranging from 3000 Da to 15,000 Da.

N. The composition according to any of Paragraphs A to I, wherein said water soluble carrier is selected from the group of C8-C22 alkyl polyalkoxylate comprising more than 40 alkoxylate units, ethoxylated nonionic surfactant having a degree of ethoxylation greater than 0, EO/PO/EO block copolymer, PO/EO/PO block copolymer, EO/PO block copolymer, PO/EO block copolymer, and combinations thereof, wherein EO is a $—CH_2CH_2O—$ group and PO is a $—CH(CH_3)CH_2O—$ group.

O. The composition according to Paragraph N, wherein said water soluble carrier is selected from the group of $R^1O$-(EO)x-(PO)y-$R^2$, $R^1O$—(PO)x-(EO)y-$R^2$, $R^1O$-(EO)o-(PO)p-(EO)q-$R^2$, $R^1O$—(PO)o-(EO)p-(PO)q-$R^2$, or a combination thereof, wherein a. $R^1$ and $R^2$ independently is H or a C1-C22 alkyl group;

b. x, y, o, p, and q independently is 1 to 100, the sum of x and y is greater than 35, and the sum of o, p and q is greater than 35; and wherein the block copolymer has a weight average molecular weight ranging from 3000 Da to 15,000 Da.

P. The composition according to any of Paragraphs A to I, wherein said carrier is selected from the group of:

a polyalkylene polymer of formula $H—(C_2H_4O)_x—(CH(CH_3)CH_2O)_y—(C_2H_4O)_z—OH$ wherein x is from 50 to 300, y is from 20 to 100, and z is from 10 to 200;

a polyethylene glycol fatty acid ester of formula $(C_2H_4O)_q—C(O)O—(CH_2)_r—CH_3$ wherein q is from 20 to 200 and r is from 10 to 30;

a polyethylene glycol fatty alcohol ether of formula $HO—(C_2H_4O)_s—(CH_2)_t)—CH_3$ wherein s is from 30 to 250 and t is from 10 to 30;

C8-C22 alkyl polyalkoxylate comprising more than 40 alkoxylate units;

ethoxylated nonionic surfactant having a degree of ethoxylation greater than 30;

polyvinyl alcohol;

polyethylene glycol having a weight average molecular weight from 2000 Da to 15000 Da; and mixtures thereof.

Q. The composition according to any of the preceding claims, wherein said plurality of individual particles is contained in a package (300), wherein said plurality of individual particles has a mass from about 100 g to about 2000 g.

R. A process for treating laundry using the plurality of individual particles according to any of the preceding claims comprising steps of:

dosing from about 10 g to about 50 g of said plurality of individual particles to a laundry washing machine or a laundry wash basin; and dissolving said plurality of individual particles in said water; and contacting said laundry with said fabric care benefit active agent.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of individual particles, wherein said individual particles comprise:

about 20% to about 99% by weight water soluble carrier; and about 0.1% to about 45% by weight fabric care benefit active agent;

wherein said individual particles have a flat bottom, a rounded top, and a maximum height orthogonal to said flat bottom;

wherein said individual particles have a porous bottom third extending from said flat bottom to a bottom third section height above said flat bottom that is one-third said maximum height and said bottom third has a bottom third average pore radius;

wherein said individual particles have a porous middle third above said bottom third and extending from said bottom third to a middle third section height above said bottom third that is one-third of said maximum height;

wherein said individual particles have a porous top third above said middle third and extending from said middle third to a top third section height above said middle third that is one-third of said maximum height and said top third has a top third average pore radius;

wherein said bottom third average pore radius and said top third average pore radius differ by less than about 15 mm;

wherein said middle third has a middle third average pore radius that is greater than each of said bottom third average pore radius and said top third average pore radius; and wherein each of said particles has a mass from about 5 mg to about 200 mg.

2. The composition according to claim 1, wherein said individual particles have a hemispherical or compressed hemispherical shape.

3. The composition according to claim 1, wherein said bottom third average pore radius and said top third average pore radius are from about 5 μm to about 100 μm.

4. The composition according to claim 1, wherein said middle third has a middle third average pore radius from about 5 μm to about 100 μm.

5. The composition according to claim 1, wherein each of said individual particles has a particle axis orthogonal to said flat bottom and passing through said middle third and a middle third average section pore radius that varies as a function of position along said particle axis, wherein said middle third average section pore radius has a range less than about 30 μm.

6. The composition according to claim 1, wherein each of said individual particles has a density less than about 1 $g/cm^3$.

7. The composition according to claim 1, wherein said fabric care benefit active agent is selected from the group of an amine, a surfactant system, nonionic surfactant, a water-binding agent, a sulfite, fatty acid and/or salt thereof, enzyme, encapsulated benefit agent, soil release polymer, hueing agent, builder, chelating agent, dye transfer inhibiting agent, dispersant, enzyme stabilizer, catalytic material, bleaching agent, bleach catalyst, bleach activator, polymeric dispersing agent, cyclodextrin complexed benefit agent, soil removal/anti-redeposition agent, encapsulated perfume, polymeric grease cleaning agent, brightener, suds suppressor, dye, hueing agent, unencapsulated perfume, structure elasticizing agent, fabric softening agent, quaternary amine, tallow, hydrotrope, organic solvent, anti-microbial agent and/or preservative, neutralizer and/or pH adjusting agent, processing aid, filler, antioxidant, rheology modifier or structurant, opacifier, pearlescent agent, pigment, anti-corrosion and/or anti-tarnishing agent, and mixtures thereof.

8. The composition according to claim 1, wherein said fabric care benefit active agent is unencapsulated perfume or encapsulated perfume.

9. The composition according to claim 1, wherein said water soluble carrier is selected from the group of polyethylene glycol, sodium acetate, sodium bicarbonate, sodium chloride, sodium silicate, polypropylene glycol polyoxoalkylene, polyethylene glycol fatty acid ester, polyethylene glycol ether, polyglycerol esters, sodium sulfate, carbohydrates, starch, and mixtures thereof.

10. The composition according to claim 1, wherein said water soluble carrier comprises polyethylene glycol having a weight average molecular weight from about 2000 Da to about 15000 Da.

11. The composition according to claim 1, wherein said bottom third average pore radius and said top third average pore radius are from about 5 μm to about 100 μm, and said middle third has a middle third average pore radius from about 5 μm to about 100 μm.

12. The composition according to claim 11, wherein said individual particles have a hemispherical or compressed hemispherical shape.

13. The composition according to claim 12, wherein each of said individual particles has a particle axis orthogonal to said flat bottom and passing through said middle third and a middle third average section pore radius that varies as a function of position along said particle axis, wherein said middle third average section pore radius has a range less than about 30 μm.

14. The composition according to claim 1, wherein said water soluble carrier is selected from the group of polyethylene glycol having a weight average molecular weight from 2000 Da to 15000 Da, polypropylene glycol, and combinations thereof.

15. The composition according to claim 1, wherein said water soluble carrier is a block copolymer having Formulae (I), (II), (III) or (IV), $$R^1O\text{-}(EO)_x\text{—}(PO)_y\text{—}R^2 \quad (I),$$

$$R^1O\text{—}(PO)_x\text{-}(EO)_y\text{—}R^2 \quad (II),$$

$$R^1O\text{-}(EO)_o\text{—}(PO)_p\text{-}(EO)_q\text{—}R^2 \quad (III),$$

$$R^1O\text{—}(PO)_o\text{-}(EO)_p\text{—}(PO)_q\text{—}R^2 \quad (IV),$$

or a combination thereof;

wherein EO is a $—CH_2CH_2O—$ group, and PO is a $—CH(CH_3)\ CH_2O—$ group;

$R^1$ and $R^2$ independently is H or a C1-C22 alkyl group;

x, y, o, p, and q independently is 1-100;

provided that the sum of x and y is greater than 35, and the sum of o, p and q is greater than 35;

wherein said block copolymer has a weight average molecular weight ranging from 3000 Da to 15,000 Da.

16. The composition according to claim 1, wherein said water soluble carrier is selected from the group of C8-C22 alkyl polyalkoxylate comprising more than 40 alkoxylate units, ethoxylated nonionic surfactant having a degree of ethoxylation greater than 0, EO/PO/EO block copolymer, PO/EO/PO block copolymer, EO/PO block copolymer, PO/EO block copolymer, and combinations thereof, wherein EO is a $—CH_2CH_2O—$ group and PO is a $—CH(CH_3)\ CH_2O—$ group.

17. The composition according to 16, wherein said water soluble carrier is selected from the group of $R^1O-(EO)_x-(PO)_y-R^2$, $R^1O-(PO)_x-(EO)_y-R^2$, $R^1O-(EO)_o-(PO)_p-(EO)_q-R^2$, $R^1O-(PO)_o-(EO)_p-(PO)_q-R^2$, or a combination thereof, wherein $R^1$ and $R^2$ independently is H or a C1-C22 alkyl group;

x, y, o, p, and q independently is 1 to 100, the sum of x and y is greater than 35, and the sum of o, p and q is greater than 35; and wherein the block copolymer has a weight average molecular weight ranging from 3000 Da to 15,000 Da.

18. The composition according to claim 1, wherein said carrier is selected from the group of:

a polyalkylene polymer of formula $H-(C_2H_4O)_x-(CH(CH_3)CH_2O)_y-(C_2H_4O)_z-OH$ wherein x is from 50 to 300, y is from 20 to 100, and z is from 10 to 200;

a polyethylene glycol fatty acid ester of formula $(C_2H_4O)_q-C(O)O-(CH_2)_r-CH_3$ wherein q is from 20 to 200 and r is from 10 to 30;

a polyethylene glycol fatty alcohol ether of formula $HO-(C_2H_4O)_s-(CH_2)_t-CH_3$ wherein s is from 30 to 250 and t is from 10 to 30;

C8-C22 alkyl polyalkoxylate comprising more than 40 alkoxylate units;

ethoxylated nonionic surfactant having a degree of ethoxylation greater than 30;

polyvinyl alcohol;

polyethylene glycol having a weight average molecular weight from 2000 Da to 15000 Da;

and mixtures thereof.

* * * * *